United States Patent
MacMillan et al.

(10) Patent No.: US 10,474,436 B1
(45) Date of Patent: *Nov. 12, 2019

(54) SYSTEM AND METHOD FOR GENERATIVE PROGRAMMING IN AN INTEGRATED DEVELOPMENT ENVIRONMENT (IDE)

(71) Applicant: Prattle Analytics, LLC, St. Louis, MO (US)

(72) Inventors: William David MacMillan, St. Louis, MO (US); Evan Albert Schnidman, Upton, MA (US); Joseph Lyons Sutherland, Hoboken, NJ (US); Daniel John Salmo, Clayton, MO (US)

(73) Assignee: Prattle Analytics, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/996,743

(22) Filed: Jun. 4, 2018

Related U.S. Application Data

(60) Provisional application No. 62/515,918, filed on Jun. 6, 2017.

(51) Int. Cl.
  *G06F 9/44* (2018.01)
  *G06F 8/34* (2018.01)
  *G06F 9/48* (2006.01)

(52) U.S. Cl.
  CPC . *G06F 8/34* (2013.01); *G06F 9/48* (2013.01)

(58) Field of Classification Search
  CPC ... G06F 8/34; G06F 8/31; G06F 8/315; G06F 8/316
  USPC ................................................ 717/109–116
  See application file for complete search history.

(56) References Cited

U.S. PATENT DOCUMENTS

| 5,659,547 | A  | * | 8/1997  | Scarr .................. G06F 11/2294 709/224 |
| 6,405,364 | B1 | * | 6/2002  | Bowman-Amuah ........................ G06Q 10/06 717/101 |
| 6,513,154 | B1 | * | 1/2003  | Porterfield ............... G06F 8/20 717/101 |
| 6,662,357 | B1 | * | 12/2003 | Bowman-Amuah ..... G06F 8/20 717/120 |
| 7,047,518 | B2 | * | 5/2006  | Little ...................... G06F 8/10 717/104 |
| 7,426,721 | B1 | * | 9/2008  | Saulpaugh ............. H04L 67/16 717/143 |

(Continued)

OTHER PUBLICATIONS

Feldthaus et al, "Tool-supported Refactoring for JavaScript", ACM, pp. 119-137 (Year: 2011).*
Iu, "Babylscript: Multilingual JavaScript", ACM, pp. 197-198 (Year: 2011).*

(Continued)

*Primary Examiner* — Anil Khatri
(74) *Attorney, Agent, or Firm* — Polsinelli PC

(57) ABSTRACT

A system transmits a request for an integrated development environment (IDE) user interface for creating an application to a server computing device, receives and displays the IDE user interface on a display, adds at least one script to the application, the at least one script one of manually entered into a code section by the user and selected from a script section displaying a list of at least one pre-written scripts, and generates machine-readable and executable code for the application based on at least one workflow when the user selects an execution user interface element.

20 Claims, 31 Drawing Sheets

(56) References Cited

U.S. PATENT DOCUMENTS

| | | | | |
|---|---|---|---|---|
| 7,493,238 | B2* | 2/2009 | Tanaka | G01M 13/028 |
| | | | | 702/183 |
| 7,802,238 | B2* | 9/2010 | Clinton | G06F 8/51 |
| | | | | 717/136 |
| 8,176,466 | B2* | 5/2012 | Tristram | G06F 8/36 |
| | | | | 717/105 |
| 8,533,666 | B2* | 9/2013 | Shukla | G06F 8/34 |
| | | | | 717/107 |
| 8,566,734 | B1* | 10/2013 | Greenfield | G06F 8/38 |
| | | | | 715/760 |
| 8,612,933 | B1* | 12/2013 | Gill | G06F 9/455 |
| | | | | 717/105 |
| 8,806,348 | B2* | 8/2014 | Quine | G06F 16/212 |
| | | | | 715/744 |
| 8,806,453 | B1* | 8/2014 | Bodkin | G06F 8/31 |
| | | | | 717/114 |
| 9,665,831 | B2* | 5/2017 | Gaucher | G06N 20/00 |
| 10,025,567 | B2* | 7/2018 | Balasubramanian | H04L 51/02 |
| 10,067,755 | B2* | 9/2018 | Kaminski | G06F 8/65 |
| 2015/0160931 | A1* | 6/2015 | Glazer | G06F 9/452 |
| | | | | 717/109 |

OTHER PUBLICATIONS

Feldthaus et al, "Efficient Construction of Approximate Call Graphs for JavaScript IDE Services" IEEE. pp. 752-761 (Year: 2013).*

Spanias et al, "Development of New Functions and Scripting Integration of Animated DSP Simulations in Web Courses", IEEE, pp. 2717-2720 (Year: 2001).*

Lau et al, "Developing XML Web services with WebSphere Studio Application Developer", IBM Systems Journal, vol. 41, No. 2, pp. 178-197 (Year: 2002).*

Jensen et al, "Modeling the HTML DOM and Browser API in Static Analysis of JavaScript Web Applications", ACM, pp. 59-69 (Year: 2011).*

Beham et al, "Scripting and Framework Integration in Heuristic Optimization Environments", ACM, pp. 1109-1116 (Year: 2014).*

Jiang et al, "Study on Real-Time Test Script in Automated Test Equipment", IEEE, pp. 738-742 (Year: 2009).*

* cited by examiner

Last 20 Runs

Last 20 workflow executions with any non-zero exits.

Workflow    Steps

Run - BOE.
Completed 29 minutes ago

Step 1
✓ [View]
✓ View
✓ View
Step 2
✓ View
Step 3
✓ View
Step 4
✓ View
Step 5
✓ View
Step 6
✓ View

Log Viewer job: rss-boe_boe_3
12:02:30 pm Job complete.
12:02:30 pm Script execution complete. 2017-03-20T16:02:30.676z
12:02:23 pm Executing script.
12:02:23 pm Spawning child process with python.
12:02:23 pm Machine meets job spec.

jobs._id: 58cff652b0a4531877c3228
complete: true
inProgress: false
warn: false
cancelled: false
createdOn: 2017-03-20T16:03:30.250Z
error: false
exitCode: 0
scriptId: 58br2f75b78a5404ad79a15
stdout:

stderr:

Error output reported here

SYSTEM AND METHOD FOR GENERATIVE PROGRAMMING IN AN INTEGRATED DEVELOPMENT ENVIRONMENT (IDE)

CROSS-REFERENCE TO RELATED APPLICATIONS

This application is related to and claims priority under 35 U.S.C. § 119 (e) to U.S. Patent Application No. 62/515,918, filed Jun. 6, 2017, entitled "SYSTEM AND METHOD FOR GENERATIVE PROGRAMMING," the entire contents of which are incorporated herein by reference.

BACKGROUND

A conventional software application is created by an experienced software developer or a team of experienced software developers that are tasked with writing source code for the application. The software developers or another team are tasked with procuring hardware specifically selected for the application. The software application is deployed to the hardware and executed by the hardware. When the software application is to be updated to address bugs/issues or add additional functionality, the developers must write new source code, procure the hardware, and redeploy the software application to the hardware. The traditional software development process is time consuming, tedious, and resistant to change.

Experienced software developers would benefit from a different and more efficient approach. Even further, many people, such as data scientists, use computers daily to complete their jobs. However, it is overly difficult for someone without a programming background and training to create a software application that could be used to perform automated tasks that may make their job easier.

It is with these issues in mind, among others, that various aspects of the disclosure were conceived.

SUMMARY

According to one aspect, a system for generative programming is provided for allowing a user to easily create a software application based on one or more scripts that may be written in one or more programming languages. This may allow novice programmers to design, test, and deploy complex production-grade applications quickly using a web-based integrated development environment (IDE). The user may create a workflow of the one or more scripts that includes one or more steps or sequences. Each step or sequence may include a subset of the one or more scripts and each step may execute the subset of the one or more scripts simultaneously. After creating the workflow, the system may create a representation of the workflow. The workflow may be a Javascript Object Notation (JSON) representation of the workflow and the system may generate machine-readable executable source code using the JSON representation. Alternatively, the workflow may be represented by Extensible Markup Language (XML), a comma separated value (CSV) file, or a different format. The workflow may be cast and assigned as one or more jobs to one or more child server computing devices and placed in a queue to be executed by the one or more child server computing devices.

According to another aspect, a system includes a memory and at least one processor to receive a request for an integrated development environment (IDE) user interface for creating an application from a client computing device and transmit the IDE user interface to the client computing device, receive application information entered into the user interface from the client computing device and store the application information in a database, receive at least one script entered into the user interface from the client computing device and store the at least one script with the application information in the database, receive a request for a workflow user interface from the client computing device and transmit the workflow user interface to the client computing device, receive a workflow entered into the workflow user interface from the client computing device, the workflow representing an order of the at least one script, generate a Javascript Object Notation (JSON) representing the workflow and store the JSON in the database, produce machine-readable and executable code based on the JSON, and assign at least one child server computing device to execute the machine-readable and executable code as at least one job.

According to another aspect, a method includes receiving, by at least one processor, a request for an integrated development environment (IDE) user interface for creating an application from a client computing device and transmitting the IDE user interface to the client computing device, receiving, by the at least one processor, application information entered into the user interface from the client computing device and storing the application information in a database, receiving, by the at least one processor, at least one script entered into the user interface from the client computing device and storing the at least one script with the application information in the database, receiving, by the at least one processor, a request for a workflow user interface from the client computing device and transmitting the workflow user interface to the client computing device, receiving, by the at least one processor, a workflow entered into the workflow user interface from the client computing device, the workflow representing an order of the at least one script, generating, by the at least one processor, a Javascript Object Notation (JSON) representing the workflow and storing the JSON in the database, producing, by the at least one processor, machine-readable and executable code based on the JSON, and assigning, by the at least one processor, at least one child server computing device to execute the machine-readable and executable code as at least one job.

According to an additional aspect, a non-transitory computer-readable storage medium includes instructions stored thereon that, when executed by a computing device cause the computing device to perform operations, the operations including receiving a request for an integrated development environment (IDE) user interface for creating an application from a client computing device and transmitting the IDE user interface to the client computing device, receiving application information entered into the user interface from the client computing device and storing the application information in a database, receiving at least one script entered into the user interface from the client computing device and storing the at least one script with the application information in the database, receiving a request for a workflow user interface from the client computing device and transmitting the workflow user interface to the client computing device, receiving a workflow entered into the workflow user interface from the client computing device, the workflow representing an order of the at least one script, generating a Javascript Object Notation (JSON) representing the workflow and storing the JSON in the database, producing machine-readable and executable code based on the JSON, and assigning at least one child server computing device to execute the machine-readable and executable code as at least one job.

According to another aspect, a system includes a memory and at least one processor to transmit a request for an integrated development environment (IDE) user interface for creating an application to a server computing device, receive and display the IDE user interface on a display, the IDE user interface comprising an application creation section that displays a user interface for creating an application, a code section that receives and displays text associated with a script, a script section that displays at least one user interface element including a list of at least one pre-written scripts, and a workflow section that displays at least one ordered step of the application and at least one script associated with each step of the application, receive application information entered into the user interface from a user and transmit the application information to the server computing device to be stored in a database, the application information comprising a name of the application, add at least one script to the application, the at least one script one of manually entered into the code section by the user and selected from the script section displaying the list of at least one pre-written scripts, transmit the at least one script with the application information to the server computing device to be stored in the database, receive at least one workflow of the at least one ordered step of the application entered into the workflow section from the user, each step comprising at least one associated script, generate machine-readable and executable code for the application based on the at least one workflow when the user selects an execution user interface element, and schedule execution of the machine-readable and executable code based on input provided by the user.

According to another aspect, a method includes transmitting, by at least one processor, a request for an integrated development environment (IDE) user interface for creating an application to a server computing device, receiving and displaying, by the at least one processor, the IDE user interface on a display, the IDE user interface comprising an application creation section that displays a user interface for creating an application, a code section that receives and displays text associated with a script, a script section that displays at least one user interface element including a list of at least one pre-written scripts, and a workflow section that displays at least one ordered step of the application and at least one script associated with each step of the application, receiving, by the at least one processor, application information entered into the user interface from a user and transmitting the application information to the server computing device to be stored in a database, the application information comprising a name of the application, adding, by the at least one processor, at least one script to the application, the at least one script one of manually entered into the code section by the user and selected from the script section displaying the list of at least one pre-written scripts, transmitting, by the at least one processor, the at least one script with the application information to the server computing device to be stored in the database, receiving, by the at least one processor, at least one workflow of the at least one ordered step of the application entered into the workflow section from the user, each step comprising at least one associated script, generating, by the at least one processor, machine-readable and executable code for the application based on the at least one workflow when the user selects an execution user interface element, and scheduling, by the at least one processor, execution of the machine-readable and executable code based on input provided by the user.

According to another aspect, a non-transitory computer-readable storage medium includes instructions stored thereon that, when executed by a computing device cause the computing device to perform operations, the operations including transmitting a request for an integrated development environment (IDE) user interface for creating an application to a server computing device, receiving and displaying the IDE user interface on a display, the IDE user interface comprising an application creation section that displays a user interface for creating an application, a code section that receives and displays text associated with a script, a script section that displays at least one user interface element including a list of at least one pre-written scripts, and a workflow section that displays at least one ordered step of the application and at least one script associated with each step of the application, receiving application information entered into the user interface from a user and transmitting the application information to the server computing device to be stored in a database, the application information comprising a name of the application, adding at least one script to the application, the at least one script one of manually entered into the code section by the user and selected from the script section displaying the list of at least one pre-written scripts, transmitting the at least one script with the application information to the server computing device to be stored in the database, receiving at least one workflow of the at least one ordered step of the application entered into the workflow section from the user, each step comprising at least one associated script, generating machine-readable and executable code for the application based on the at least one workflow when the user selects an execution user interface element, and scheduling execution of the machine-readable and executable code based on input provided by the user.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

Figure 5B:
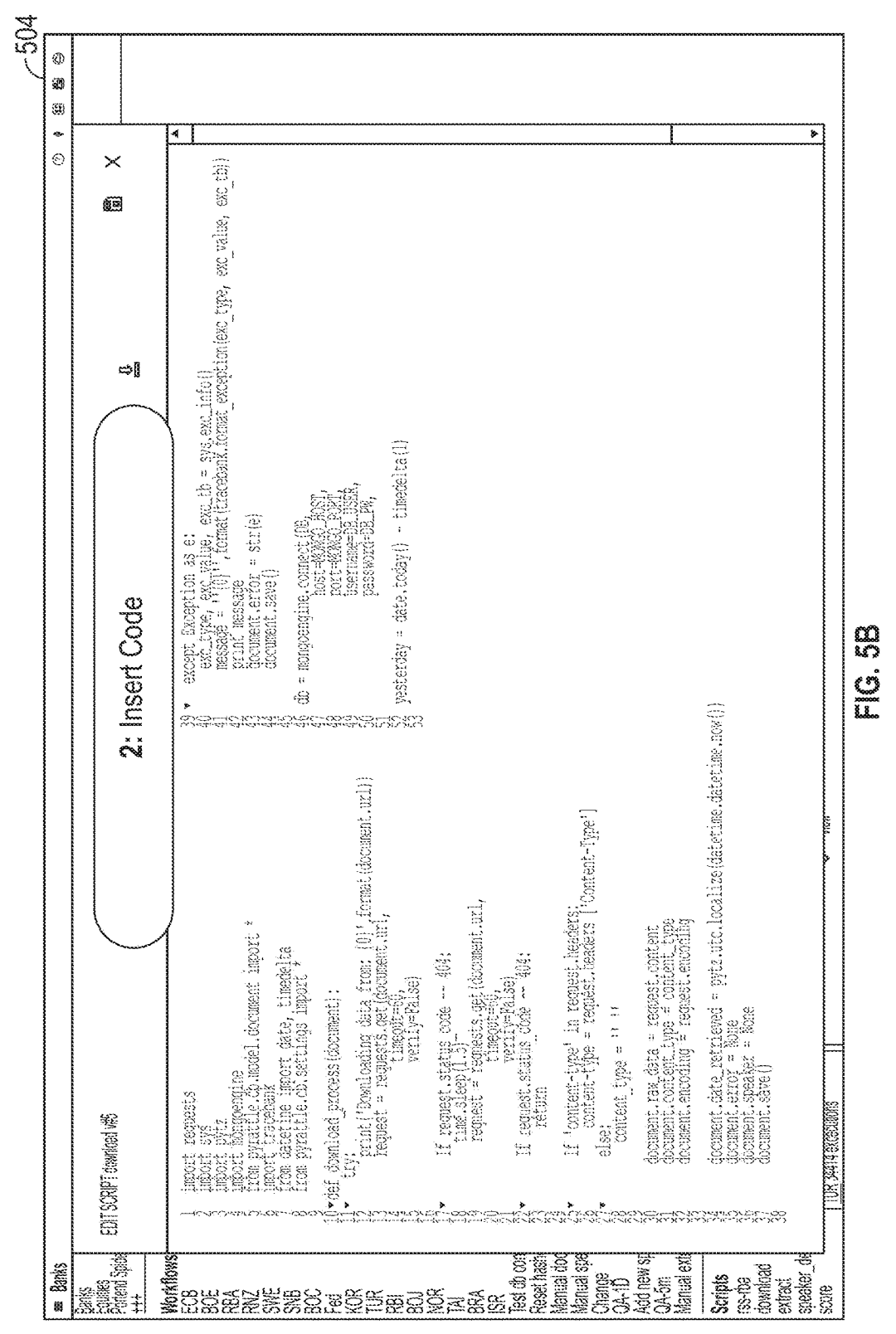
Figure 6A:
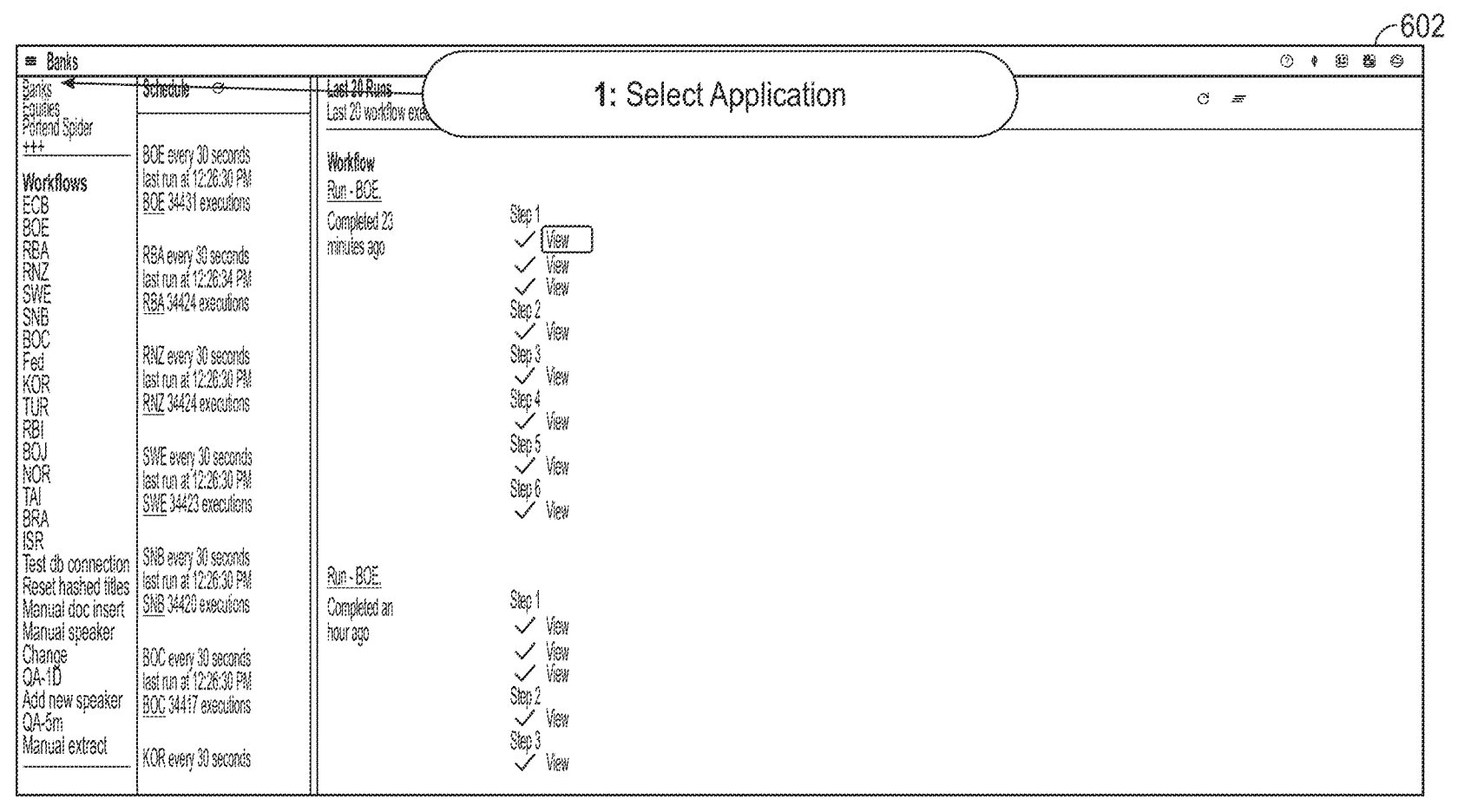
Figure 6B:
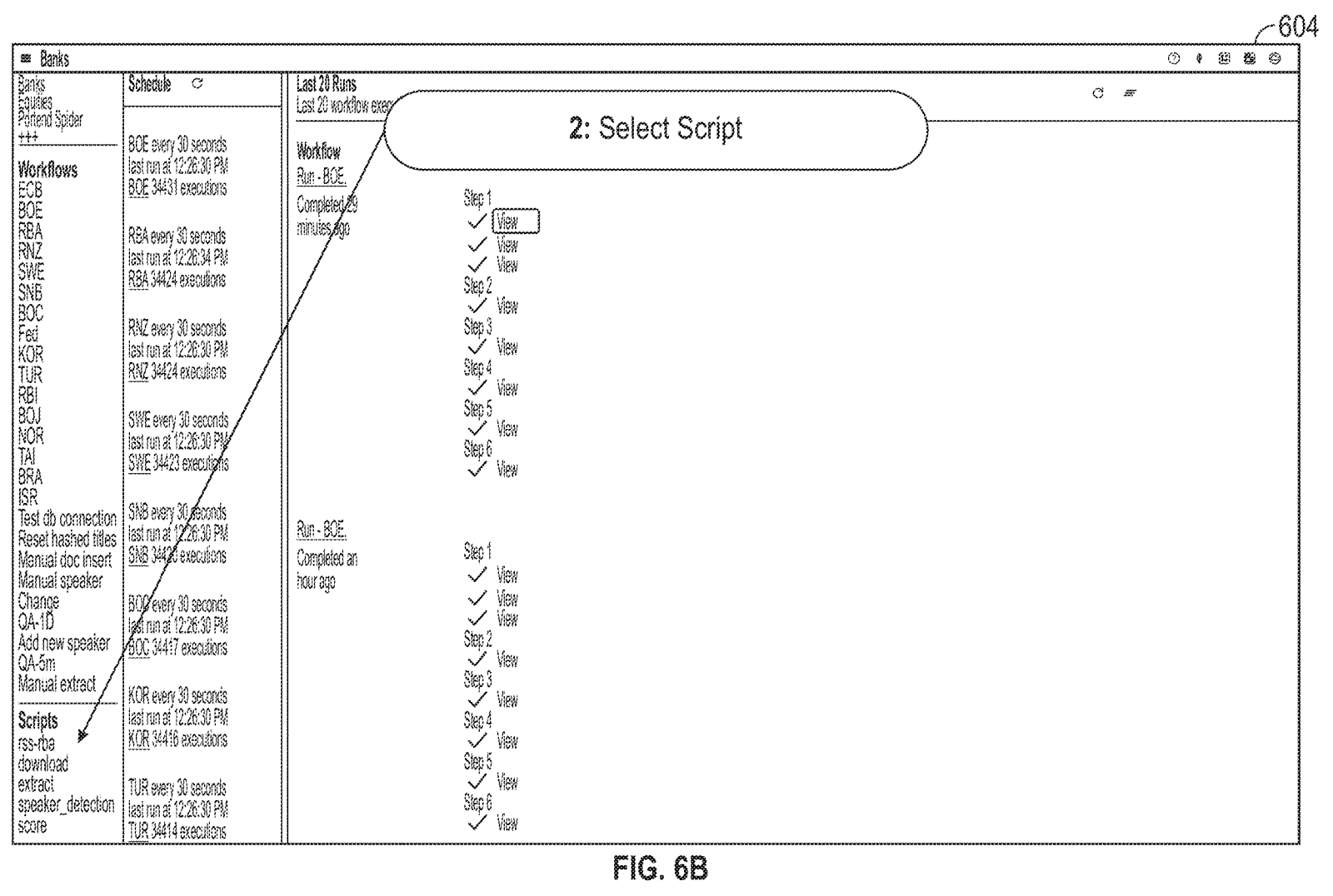
Figure 7A:
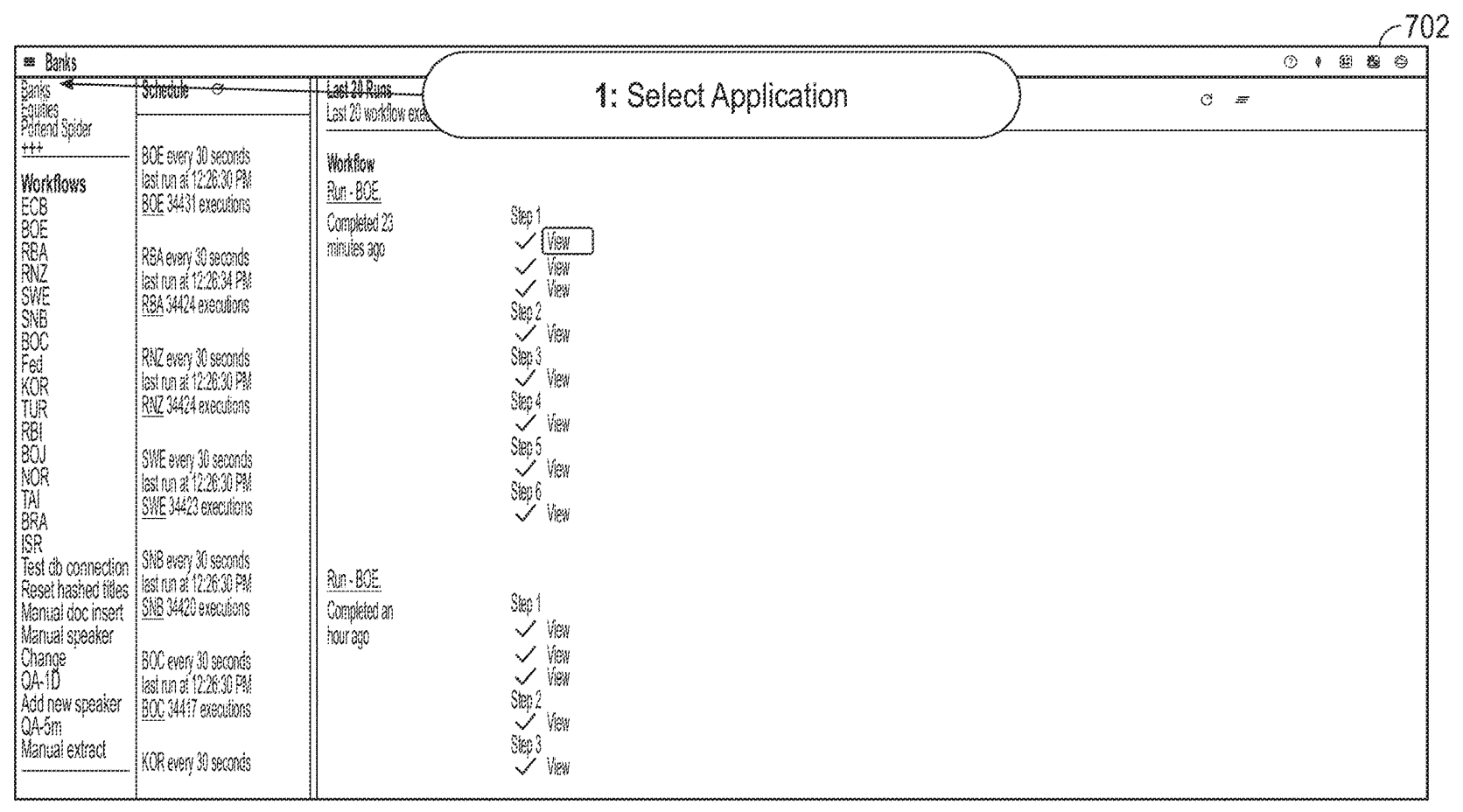

FIGS. 5A-13 illustrate example screenshots of a user interface provided by the system for generative programming and displayed by a computing device.

FIGS. 15A and 15B illustrate another example embodiment of a user interface provided by the system for generative programming and displayed by a computing device.

DETAILED DESCRIPTION

Figure 1:
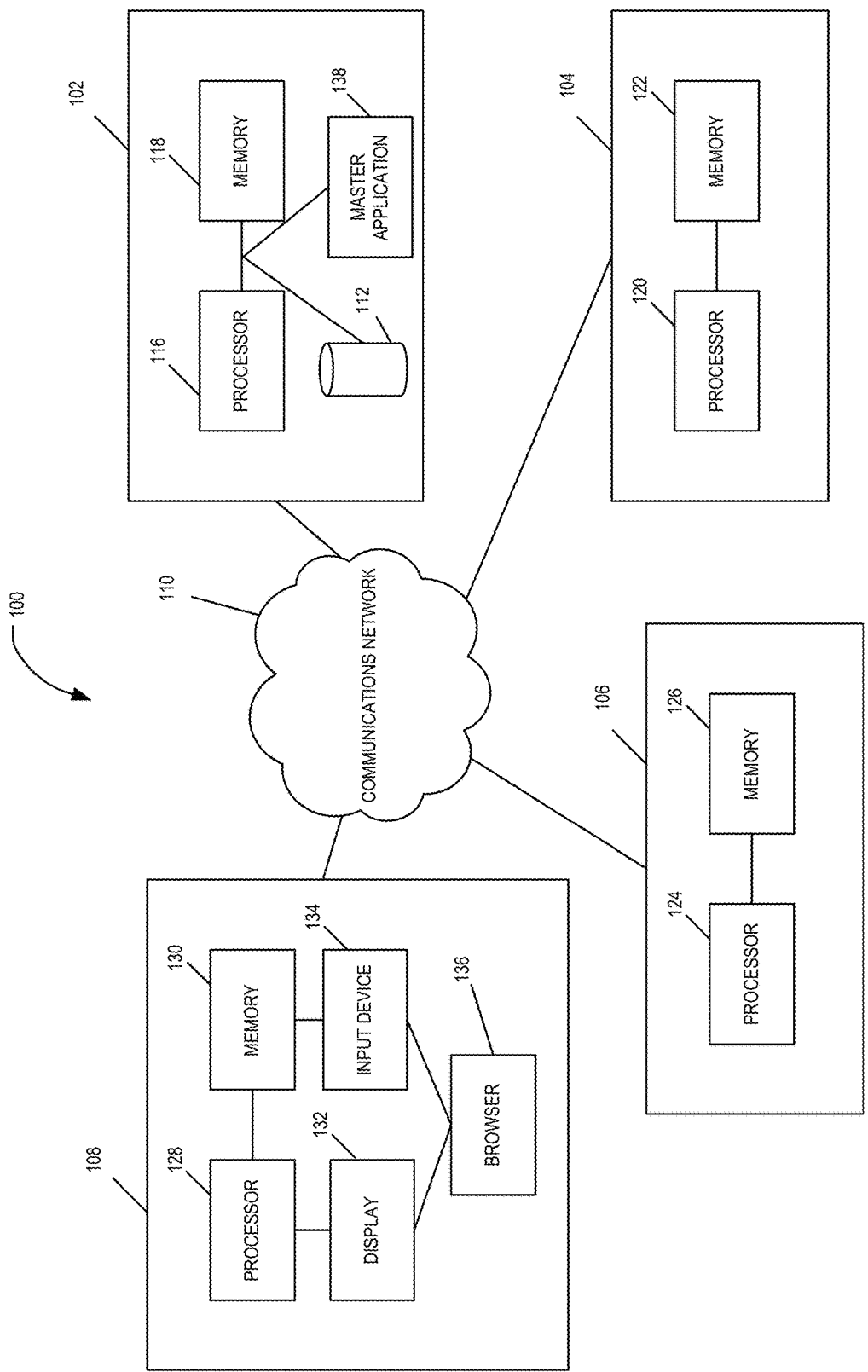
FIG. 1 is a block diagram of a system for generative programming according to an example embodiment.

Aspects of a system and method for generative programming provide a master server computing device that allows a user to easily create a software application using a web browser via a web-based IDE and deploy a software application to server computing devices. The master server computing device includes memory and at least one processor to receive a request for an integrated development environment (IDE) user interface for creating an application from a client computing device and transmit the IDE user interface to the client computing device, receive application information entered into the user interface from the client computing device and store the application information in a database, receive at least one script entered into the user interface from the client computing device and store the at least one script with the application information in the database, receive a request for a workflow user interface from the client computing device and transmit the workflow user interface to the client computing device, receive a workflow entered into the workflow user interface from the client computing device, the workflow representing an order of the at least one script, generate a Javascript Object Notation (JSON) representing the workflow and store the JSON in the database, produce machine-readable and executable code based on the JSON, and assign at least one child server computing device to execute the machine-readable and executable code as at least one job.

The various concepts described herein involve one or more computing devices that provide a master server computing device that creates and deploys software applications based on one or more scripts received from client computing devices. The system disclosed herein provides a generative programming platform that is suitable for use by data scientists and other types of users. The system abstracts application logic and code away from the execution of that code to allow novice programmers to design, test, and deploy complex production-grade applications quickly. In addition, the platform allows for the generative assembly of a distributed computational infrastructure, portable application development, on-the-fly modifications, easy stack-traces, and language-agnostic functionality, among other features. The system provides infinitely scalable execution and tracking of multilingual remote procedure call (RPC) operations. In addition, the system provides distributed computing that is agnostic of the application and an application framework that is language agnostic. The system allows for the real-time modification of a production application and allows for mapping conceptual analysis pipelines (e.g., micro-ETLs) to machine-readable distributed computation instructions. In addition, the system provides for automated deployment to server computing devices.

The system described herein provides benefits that are not provided by conventional solutions such as scalability, resource accessibility, language agnostic features, ease of use by users with a minimal training time, and users need not have a technical or computer science background. Existing software may allow for distributed computation, but usage must be tailored for each specific application. The system discussed herein provides the abstraction of distributed computation away from the application level. The system may use the same distributed computation paradigm regardless of the application, while allowing application-specific controls to be put in place if desired.

As an example, Celery is a software package that helps with distributed computation. A developer must build application-specific usage around Celery. For example, if a developer wants to build an application that distributes the extraction of text from documents such as Portable Document Format files (PDFs), the developer must build a Celery application that specifically extracts text from PDFs. In contrast, the system described herein allows a user to write a script to extract from a PDF in any programming language, and then allows the user to easily distribute the execution of that script over N servers. In one example, the user may use a web-based user interface presented on a display of a client computing device to select a script that performs a function that is pre-written and drag and drop the script into an area of the user interface. The user may then deploy the script to the N servers by selecting a button or another user interface element available in the user interface. Alternatively, the user may enter (e.g., type or copy and paste) at least one script into the user interface that provides a text entry field. The user may drag and drop the at least one script into an area of the user interface. The user may then deploy the script to the N servers by selecting a button available in the user interface. The system is easier to use for the same reason it is an efficient solution to distributed computation. In an exemplary embodiment, the computational infrastructure is divorced from application-level code. Thus, when the user wants to make changes to application code, the user does not have to worry about modifying or shutting down the computational infrastructure. The user may simply modify the code and is done.

The system allows the user to rapidly prototype and run multilingual software applications. The system allows the user to easily create these software applications using the web-based drag-and-drop interface. In addition, the system provides distributed computation of the software application by selecting a button or another user interface element using the same drag-and-drop user interface. After the application is deployed to the N servers, the user may easily modify existing application code without affecting the application.

As an example, the development of a conventional extract-transform-load (ETL) application that extracts raw text from a database, transforms the raw text into a cleaned term frequency matrix, and saves the term frequency matrix to a database may take weeks to months. A developer may create a boilerplate application framework that may allow event-driven script execution. The developer may ensure the application is properly set up for logging, monitoring, load management, error handling, database interface, and deployment. The developer may spend the weeks to months to create and test the framework and then the developer may write ETL operation code in a specific programming language. For a computationally-intensive task such as this one, the developer must determine how to parallelize the task across a number of servers via RPC. The parallelization code must be written within the limitations of the chosen programming language's multiprocessing capacity. The developer must then set up a distributed processing infrastructure that communicates with the application, which may involve the development of more testing tools, deployment tools, and servers. The developer may build an event handler to instruct the ETL operation to run on receipt of new data. The developer may then have to deploy the application into production. If the developer desires to change any of the application's functionality, the process may begin all over again. Any change in functionality may demand an updated framework in which to perform the RPC operations.

In an exemplary embodiment, a user using a client computing device may create a new application using the system. The client computing device may request a user interface from a master server computing device. The user interface may include a dashboard associated with the system. The dashboard may include one or more panels or sections. A first section may include an application section that may include a list of one or more applications created by the user. A second section may include a list of one or more scripts created by the user. A third section may include a main code section that displays text associated with a script. A fourth section may include a workflow section that displays one or more workflows associated with the one or more applications. The fourth section may also allow the user to compose, change, and execute application workflows. A fifth section may include a schedule section that shows scheduled workflows. A sixth section may include a log section that displays log information provided by applications that have been executed. Other sections are also possible. When a panel or section is selected, the panel may become a modal window that is displayed on top of the user interface. The user may close the modal window and the dashboard may be viewable again.

The master server computing device may transmit a "Make new application" user interface to the client computing device. The user of the client computing device may input new application information and the client computing device may transmit the new application information to the server computing device for storage in a database. The server computing device may transmit status information to the client computing device that indicates that the new application information is stored in the database.

Next, the user of the client computing device may create one or more scripts to execute tasks associated with the new application. The user of the client computing device may select a "new script" button or another user interface element. The server computing device may receive the request and transmit a web based integrated development environment (IDE) that is displayed by the client computing device. The user of the client computing device may name the new script and input code to the user interface provided by the IDE. The client computing device may periodically transmit the code to the server computing device and the server computing device may save the code as the script in the database. The user of the client computing device may create one or more scripts to perform one or more operations for the application.

Next, the user of the client computing device may string the one or more scripts together into one or more workflows for execution. The user of the client computing device may select a "new workflow" button or another user interface element. The server computing device may receive the request and transmit a drag-and-drop user interface editor to the client computing device that allows the user to select each of the one more scripts and place them into the workflow for execution. The user may drag each script into the workflow. The server computing device receives the workflow information from the client computing device and may generate a Javascript Object Notation (JSON) structure that represents the workflow. The user of the client computing device may save the workflow and the master server computing device may store the JSON structure in the database.

An example JSON representation is shown below:
```
{
"_id": ObjectId("583cb36ec8fa4b42dc61bc62"),
"name": "a workflow",
"info": "a description of the workflow",
"steps": {
"1": [
{
"hasData": false,
"name": "step 1, script 1",
"_id": "582c7f8d00b8ce840284e097"
},
{
"hasData": false,
"name": "step 1, script 2",
"_id": "582c893e3539ca150a02dd38"
}
],
"2": [{
"hasData": false,
"name": "step 2, script 1",
"_id": "582a2a36e8aeffef5270f4b4"
}
],
},
"appId": ObjectId("583382c911a19d5efa4f2d8a"),
"_v": NumberInt(0)
}
```

Next, the user of the client computing device may schedule the execution of the workflow. The user may select when the master server computing device schedules the workflow to run one or more times, which may be immediate or as soon as possible. The master server computing device may create a scheduling event that is associated with an identifier for the workflow.

The master server computing device may generatively produce machine-readable and executable code that is based on the JSON structure that represents the workflow and schedule one or more jobs to execute the machine-readable and executable code. The master server computing device may cast the workflow into one or more jobs that are placed into a queue for execution. A script may be associated with one job or more than one job. The job may indicate the language of associated code in scripts, the version of the language, textual content of the scripts, data for macro expansion, and other information.

The master server computing device may assign each job to one or more child server computing devices by sending a message to a message broker server computing device to select and assign the job to the one or more child server computing devices. The message may include a job identifier for the job.

If the job is a recurring job (e.g., daily, hourly, every minute, every X seconds), the job will be placed into the queue of jobs repeatedly and scheduled for a time. The one or more child server computing devices may be selected based on a current load or an estimated load at the estimated time of execution of the job.

The one or more child server computing devices may execute the job and transmit a log associated with the job to the message broker server computing device. The message broker server computing device may transmit the log or information associated with the log to the master server computing device. The log may be stored in the database and viewable by the user of the client computing device. The log may include a status code to indicate if the job is finished, is in progress, has reached a milestone, has written to standard input (stdin), standard output (stdout), and standard error (stderr), or if the child server computing devices are under too much load or underutilized. If the log indicates that the child server computing device is under too much load, the master server computing device may add one or more additional child server computing devices to address the load and shift the computational burden. In addition, if a child server computing device is underutilized, the child server computing device may send a message to the master server computing device and the child server computing device may be removed from service.

FIG. 1 shows a block diagram of a computing system comprising a generative programming system 100 according to an example embodiment. The generative programming system 100 automatically generates source code through the use of classes and constructs to allow for the execution of multilingual, parallelized RPC operations in a data science context or another context. The system 100 functionally maps application code to machine-readable instruction sets which are interpreted by servers in an RPC pool of servers.

The generative programming system 100 may be deployed using minimal user intervention. The system 100 may be deployed to Amazon Web Services or another cloud computing service.

The generative programming system 100 includes at least one master server computing device 102 having a master application 138 that is in communication with at least one child server computing device 104, at least one message broker server computing device 106, and at least one client computing device 108 via a communication network 110. The generative programming system 100 may also include at least one database server computer that may be a relational database management system (RDBMS) or another type of database management system that stores and communicates data from at least one database 112. In one example, the database 112 may be a NoSQL database such as a MongoDB database. The data stored in the at least one database 112 may be generative application data, among other data. The at least one master server computing device 102 is configured to receive data from and/or transmit data to the at least one child server computing device 104 through the communication network 110. Although the at least one master server computing device 102 is shown as a single server, it is contemplated that the at least one master server computing device 102 may include multiple servers, for example, in a cloud computing configuration. Additionally, the at least one master server computing device 102 is configured to receive data and/or transmit data to the at least one message broker server 106 and the at least one client computing device 108 through the communication network 110.

The communication network 110 can be the Internet, an intranet, or another wired or wireless communication network. For example, the communication network 110 may include a Mobile Communications (GSM) network, a code division multiple access (CDMA) network, $3^{rd}$ Generation Partnership Project (GPP), an Internet Protocol (IP) network, a wireless application protocol (WAP) network, a WiFi network, or an IEEE 802.11 standards network, as well as various communications thereof. Other conventional and/or later developed wired and wireless networks may also be used.

The at least one master server computing device 102 includes at least one processor 116 to process data and memory 118 to store data. The processor 116 processes communications, builds communications, retrieves data from memory 118, and stores data to memory 118. The processor 116 and the memory 118 are hardware. The memory 118 may include volatile and/or non-volatile memory, e.g., a computer-readable storage medium such as a cache, random access memory (RAM), read only memory (ROM), flash memory, or other memory to store data and/or computer-readable executable instructions such as a portion or component of the master application 138. In addition, the at least one master server computing device 102 further includes at least one communications interface to transmit and receive communications, messages, and/or signals.

The at least one child server computing device 104 includes at least one processor 120 to process data and memory 122 to store data. The processor 120 processes communications, builds communications, retrieves data from memory 122, and stores data to memory 122. The processor 120 and the memory 122 are hardware. The memory 122 may include volatile and/or non-volatile memory, e.g., a computer-readable storage medium such as a cache, random access memory (RAM), read only memory (ROM), flash memory, or other memory to store data and/or computer-readable executable instructions such as applications created by users. In addition, the at least one child server computing device 104 further includes at least one communications interface to transmit and receive communications, messages, and/or signals.

The at least one message broker server computing device 106 includes at least one processor 124 to process data and memory 126 to store data. The processor 124 processes communications, builds communications, retrieves data from memory 126, and stores data to memory 126. The processor 124 and the memory 126 are hardware. The memory 126 may include volatile and/or non-volatile memory, e.g., a computer-readable storage medium such as a cache, random access memory (RAM), read only memory (ROM), flash memory, or other memory to store data and/or computer-readable executable instructions such as RabbitMQ that provides message orientation, queuing, and routing between computing devices of the system 100. RabbitMQ operates using the Advanced Message Queuing Protocol (AMQP).

In one example, the message broker server computing device 106 may execute RabbitMQ or another type of messaging software that provides a queue for sending and receiving messages. Each of the computing devices of the system 100 may send and receive messages using the at least one message broker server computing device 106. The at least one master server computing device 102 may send a message to the at least one child server computing device 104 through the at least one message broker server computing device 106 that includes information associated with one or more jobs and the at least one child server computing device 104 may send a message through the at least one message broker server computing device 106 in response to the at least one master server computing device 102. In addition, the at least one message broker server computing device 106 further includes at least one communications interface to transmit and receive communications, messages, and/or signals.

The at least one client computing device 108 includes at least one processor 128 to process data and memory 130 to store data. The processor 128 processes communications, builds communications, retrieves data from memory 130, and stores data to memory 130. The processor 128 and the memory 130 are hardware. The memory 130 may include volatile and/or non-volatile memory, e.g., a computer-readable storage medium such as a cache, random access memory (RAM), read only memory (ROM), flash memory, or other memory to store data and/or computer-readable executable instructions such as a portion or a component of the master application 138 displayed and executed by a browser 136. In addition, the at least one client computing device 108 further includes at least one communications interface to transmit and receive communications, messages, and/or signals.

The at least one client computing device 108 can be a laptop computer, a smartphone, a personal digital assistant, a tablet computer, a standard personal computer, or another processing device. The at least one client computing device 108 may include a display 132, such as a computer monitor, for displaying data and/or graphical user interfaces. The at least one client computing device 108 may also include an input device 134, such as a camera, a keyboard or a pointing device (e.g., a mouse, trackball, pen, or touch screen) to enter data into or interact with graphical and/or other types of user interfaces. In an exemplary embodiment, the display 132 and the input device 134 may be incorporated together as a touch screen of the smartphone.

The at least one client computing device 108 may display on the display 132 a graphical user interface (or GUI) application to generate a graphical user interface on the display 132. The graphical user interface may be provided by the browser 136 and the master application 138 which may be transmitted from the master server computing device 102. The graphical user interface enables a user of the at least one client computing device 108 to interact with the at least one master server computing device 102 and the master application.

The master application 138 may be a component of an application and/or service executable by the at least one client computing device 108 and/or the at least one master server computing device 102. For example, the master application 138 may be a single unit of deployable executable code or a plurality of units of deployable executable code. According to one aspect, the master application 138 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

Figure 2:
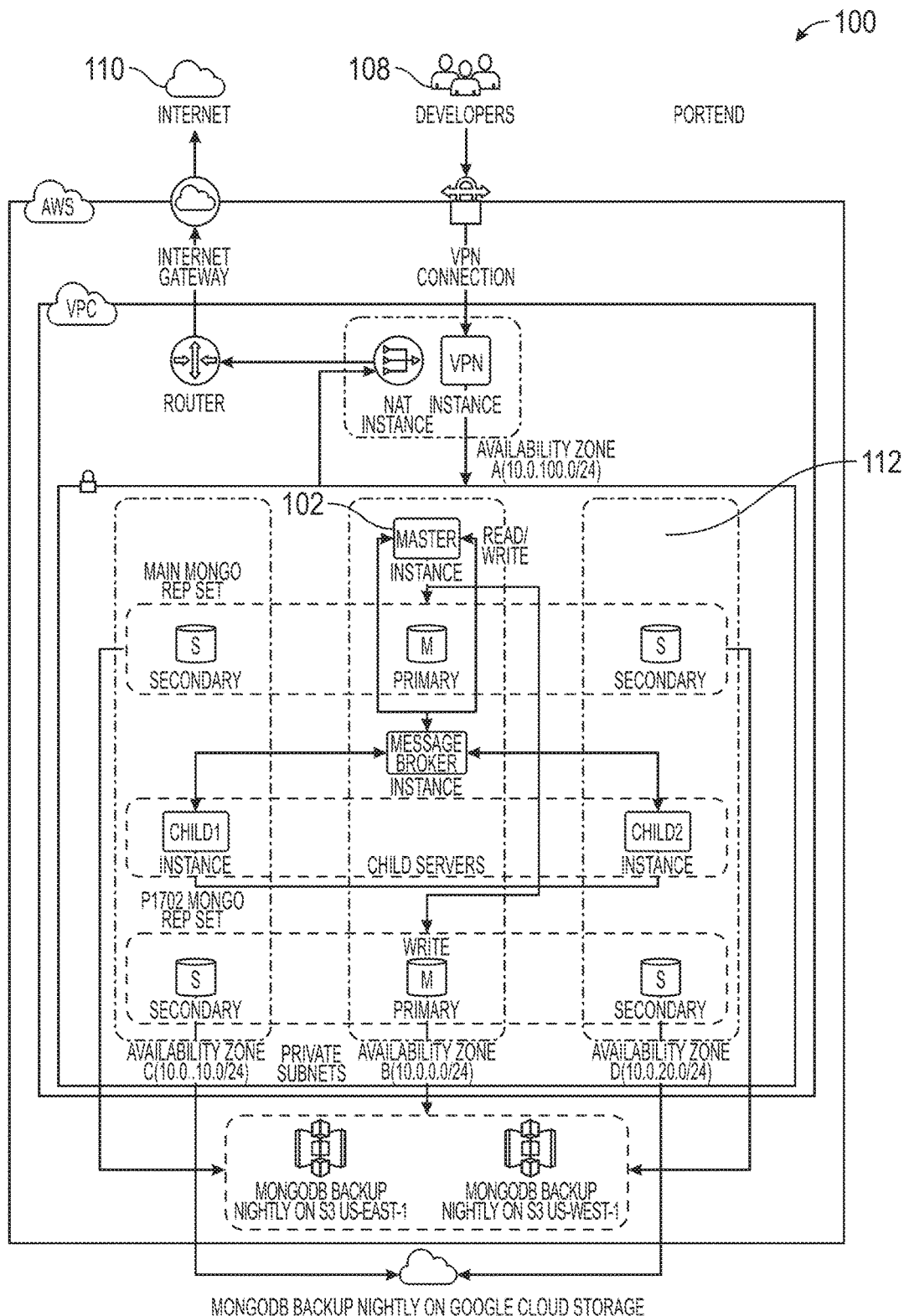
FIG. 2 shows another block diagram of the system for generative programming according to an example embodiment.

FIG. 2 illustrates another block diagram of the generative programming system 100 according to an example embodiment. As shown in FIG. 2, developers may use the client computing device 108 to access the system 100. The user or developer may transmit a request to create an application to the master server computing device 102 via the communication network 110. The master server computing device 102 may transmit the IDE user interface to the client computing device 108. Using the IDE user interface, the developer may create the application including one or more scripts and a workflow associated with the one or more scripts. The developer may submit a request to the master server computing device 102 to begin execution of the application. The master server computing device 102 may store the application in the database 112. As shown in FIG. 2, the database 112 may include primary instances of the database 112 and secondary instances of the database 112. The secondary instances of the database 112 may be copies or backups of the primary instance of the database 112. In addition, the database 112 may be replicated across multiple different zones that are geographically dispersed such as a first zone, a second zone, and a third zone. At a particular time, e.g., nightly, the generative programming system 100 may backup the database 112 in one or more locations such as a first east backup zone and a second west backup zone. In addition, the database 112 may be backed up using one or more different cloud computing platforms such as AMAZON WEB SERVICES™ and GOOGLE CLOUD PLATFORM™, among others. Also as shown in FIG. 2, the application and its associated jobs may be placed into the queue by the master server computing device 102 for execution by the one or more child server computing devices 104.

Figure 3:
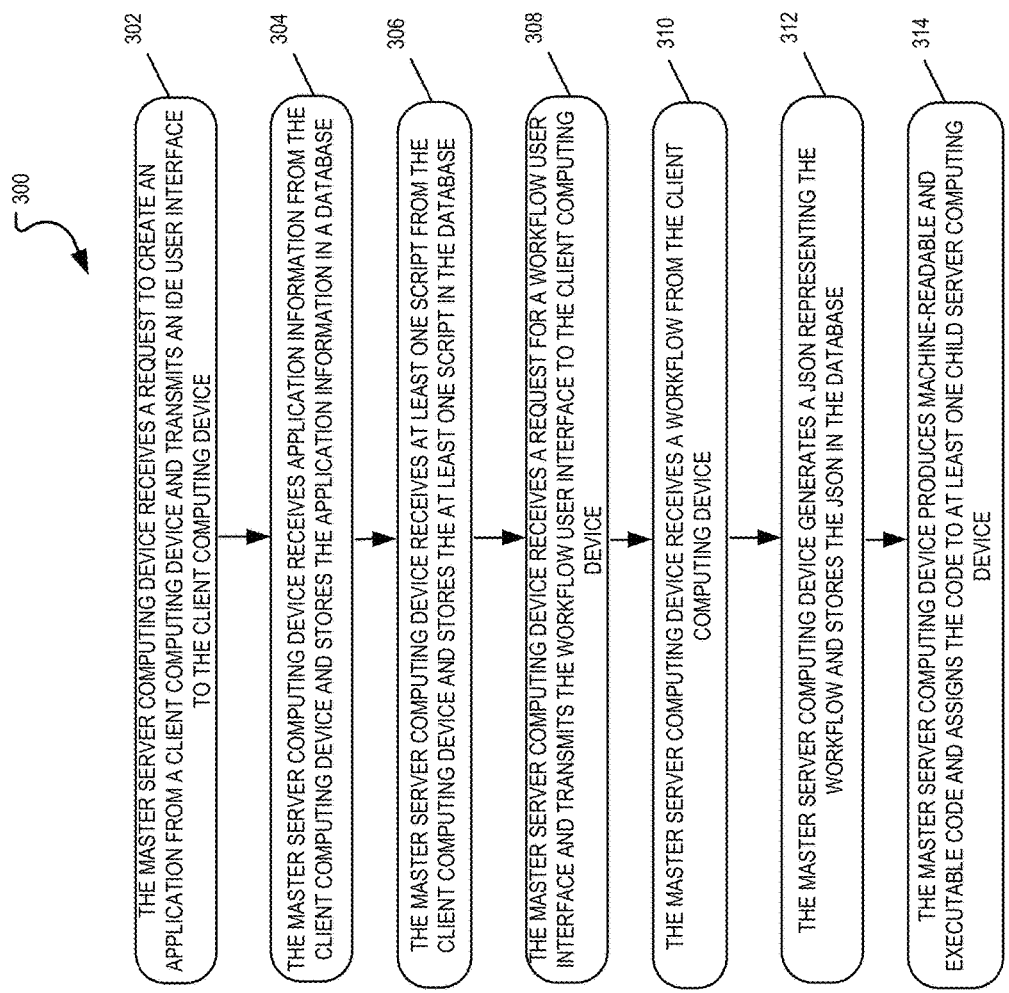
FIG. 3 illustrates a flowchart for creating and executing an application according to an example embodiment.

FIG. 3 illustrates a flowchart of a process 300 for creating and executing an application for the system according to an example embodiment. In step 302, the master server computing device 102 receives a request to create an application from the client computing device 108 and transmits the IDE user interface to the client computing device 108. Next, in step 304, the master server computing device 102 receives application information from the client computing device 108 and stores the application information in the database 112. In step 306, the master server computing device 102 receives at least one script from the client computing device 108 that may be entered into the IDE user interface and stores the at least one script in the database 112 along with the application information. The user may type or copy and paste the script into the user interface. Alternatively, if the script is already written, the user may select a user interface element such as a button that represents the script and drag the button to a particular location within the user interface. The button may show a name of the script and/or functionality associated with the script. Even further, the user may utilize macro expansion to generatively produce a script. As an example, the user may define a macro token and one or more macro values that may be associated with the script. When a workflow associated with the script is executed, a new script may be created for each macro value. Each new script may be a template from the base script with the macro token replaced with the macro value.

Each script may be written in a different programming language and the master server computing device 102 determines the programming language for each script. As an example, a first script may be written in JAVASCRIPT®, a second script may be written in PYTHON®, a third script may be written in R, etc. Other programming languages are possible such as PERL® and PHP, among others.

Next, in step 308, the master server computing device 102 receives a request for a workflow user interface from the client computing device 108. The master server computing device 108 may transmit the workflow user interface to the client computing device 108. Next, in step 310, the master server computing device 102 may receive a workflow that may be entered into the workflow user interface and store the workflow in the database 112 along with the application information. The workflow may represent an order of the at least one script. Each step or sequence may include one or more scripts that may be written in different programming languages. The first step may include a first script written in JAVA®. The second step may include a script written in Java and a third step may include a script written in R. In other words, the application may include three discrete steps.

As another example, a first script to perform a first step may detect new documents and may be written in PYTHON. A second script to perform a second step and parse the new document may be written in PYTHON. A third script to perform a third step and perform linear regression may be written in R. Each script may include an exit code that indicates execution details regarding the script. As an example, an exit code of "0" may indicate that the script did not have any errors and to halt the workflow. An exit code of "1" may indicate that an error occurred and to halt the workflow. An exit code of "212" may indicate to continue the workflow asynchronously. An exit code of "202" may indicate to loop the current script.

In step 312, the master server computing device 102 may generate a JSON representation of the workflow and store the JSON representation in the database 112. In step 314, the master server computing device 102 may produce machine-readable and executable code that is based on the JSON. The master server computing device 102 may cast the JSON into one or more assignable jobs and assign one or more jobs to execute the machine-readable and executable code to at least one child server computing device 104. As an example, a first job or jobs may be associated with the first step, a second job or jobs may be associated with the second step, and a third job or jobs may be associated with the third step. The master server computing device 102 may send a message to the message broker server computing device 106 that coordinates message passing between the master server computing device 102 and the at least one child computing device 104.

The child server computing device 104 may consume or parse a message received from the message broker server computing device 106. As an example, a message may have a format similar to the following:

{
jobID: alsdf79ebfiub9ka,
queueID: norubkasd839d,
}

The message may be published to an exchange that is indicative of job priority (e.g., higher priority jobs will be executed first) and scripting requirements (e.g., certain jobs may require certain packages available on and associated with certain child server computing devices). An exchange is a pool of messages provided by the message broker server computing device 106 and the exchange may be stored in memory 126 of the message broker server computing device 106. The master server computing device 102 and the one or more child server computing devices 104 may publish and consume messages from multiple exchanges. Each exchange may allow different behavior. As an example, a child server computing device 104 may consume messages from a particular exchange before consuming messages from other exchanges. In addition, the exchange may distribute messages in a round robin order, a random order, or another order to balance message distribution from the master server computing device 102 to the one or more child server computing devices 104.

The parsed message may include a job identifier. The child server computing device 104 may query the database 112 using the job identifier to obtain information about the job including scripting requirements (e.g., programming language, version, and associated package information) and instructions for the associated script of the job. The child server computing device 104 may ensure that all programming language, version, and package requirements are met by the child server computing device 104. In addition, the child server computing device 104 may ensure that the processor 120 load does not exceed dangerous levels (e.g., greater than 95% average for one minute). If these requirements are not met, the child server computing device 104 may reject the job request and send a message to the master server computing device 102 through the message broker server computing device 106. If all requirements are met, then the child server computing device 104 may begin to execute the job. The child server computing device 104 may save a template of the script to memory 122 of the child server computing device by obtaining the script identifier from the database 112 and inserting any data via macro expansion. The child server computing device 104 may then execute the script by calling the language compiler as indicated by the job identifier. The script may run and the child server computing device 104 may capture all output using stdout and/or stderr. The child server computing device 104 may send all output to the master server computing device 102 and may capture an exit code. The child server computing device 104 may send the exit code to the master server computing device 102 with a completed flag.

According to an exemplary embodiment, the system 100 may convert abstracted source code to machine-readable instructions, which is exemplary of the generative programming paradigm, a style of computer programming that automatically generates source code through the use of generic classes and constructs. The system 100 may use constructs genericized specifically to allow for the execution of multilingual, parallelized RPC operations in a data science context without the need to write any application-level service bus to do so. The system 100 may functionally map application code to machine-readable instruction sets defined with the generic constructs, which are then interpreted standardly by child server computing devices 104 in an RPC pool. In the field of statistics, random variables describe possible outcomes of interest. However, according to the system 100, application code may describe possible executions of machine-readable code.

A user of the system 100, such as a user of a client computing device 108 may define application at an abstraction level. At the abstraction level, the application code may be easily defined and changed because it is separate from the machine-level code. As an example, according to the system 100, a script is a script of source code, written in any programming language. A step may include a list of scripts, to be executed in parallel. The scripts in a step may be executed at the same time by the system 100. If any executed script sends a "continue" signal, then the workflow may advance to a next step and issue any scripts in that step. A workflow may include a list of steps. Steps may be executed in order. Thus, a next step is executed only if a current step signals that the workflow should progress. An application, according to the system 100, may include a set of workflows. Applications may be viewed as a tool to indicate which workflows go together.

Everything at the execution level may be created generatively by the system 100. As an example, a job according to the system 100 may include a set of instructions to be executed by a worker such as a child server computing device 104. A job may include information to run a script, such as a language and a version of the language, a command for the binary, packages necessary, and the script itself. Related metadata for optimization also may be included. In other words, a job is a realization of the script for the system 100.

A queue of the system 100 may include a skeleton for the execution of a workflow. The queue may track a status of complete jobs and the system 100 may use the queue to determine what instructions to issue upon completion of a step if a signal to proceed was received. In other words, the queue is a realization of the workflow for the system 100.

The delineation between generic source code and execution of machine-readable code based on the generic source code makes the system 100 scalable. Workflows and scripts may be locked into place when they are executed by the system 100. However, the workflows and scripts may be modified on the fly without changing the way the system 100 communicates distributed operations. Rolling updates to the pool of child server computing devices 104 may allow the child server computing devices 104 to execute code for new binaries without requiring an application-level update.

Thus, according to an exemplary embodiment, a user may use the client computing device 108 to build an application within the system 100 by defining workflows, which are lists of scripts. The user may schedule workflows to be executed. When a workflow is executed, the system 100 may convert the workflow (and associated scripts) into a well-defined set of queues and jobs. The queues and jobs may be communicated to the pool of child server computing devices 104, which execute the instructions associated with the queues and jobs. As a result, the system may provide rapid development and deployment of scalable production applications for both experienced developers and non-experienced developers in ways not conventionally possible. As a result, the distributed system 100 may provide improvements in computing such as efficiently processing a plurality of applications created by experienced and non-experienced users of client computing devices 108 that may be distributed to the child server computing devices 104 and executed by the child server computing devices 104. The system 100 may monitor the load of the child server computing devices 104 to ensure that the child server computing devices 104 do not have a maximum processor load and more efficiently process the applications. The users of the client computing devices 108 do not have to be concerned with monitoring the status of the servers of the system, rather the system 100 may maintain and distribute the execution of the applications to child server computing devices 104 to maintain a proper processing load throughout the pool of the child server computing devices 104.

The pool of child server computing devices 104 may collectively manage the workload placed on them by the master server computing device 102. The child server computing devices 104 may take single jobs from the message broker server computing device 106, which they execute agnostic to any broader level of flow control. The job of any given child server computing device 104 may be to process a job in a siloed environment and report back to the master server computing device 102 with the status of the job.

The child server computing devices 104 are language-agnostic. In other words, they may run and execute any programming language that the system 100 is configured to run. In addition, the infrastructure associated with the child server computing devices 104 is generalized such that the system 100 can run new languages within a matter of minutes. In addition, the child server computing devices 104 can be built for specific applications. Thus, the child server computing devices can be deployed as siloed test units that are specifically configured and secured for client needs. The system is prepared for system as a service (SaaS) deployment, such that every user or client of the system can roll their own system within the infrastructure of the system 100. As a result, the child server computing devices 104 include a worker pool that is horizontally scalable. When a child server computing device 104 executes a job, all information, including stacktraces, is reported back to the master server computing device 102. With this information, users of the client computing device 108 can identify errors in their applications and painlessly fix the issues and errors.

Figure 4:
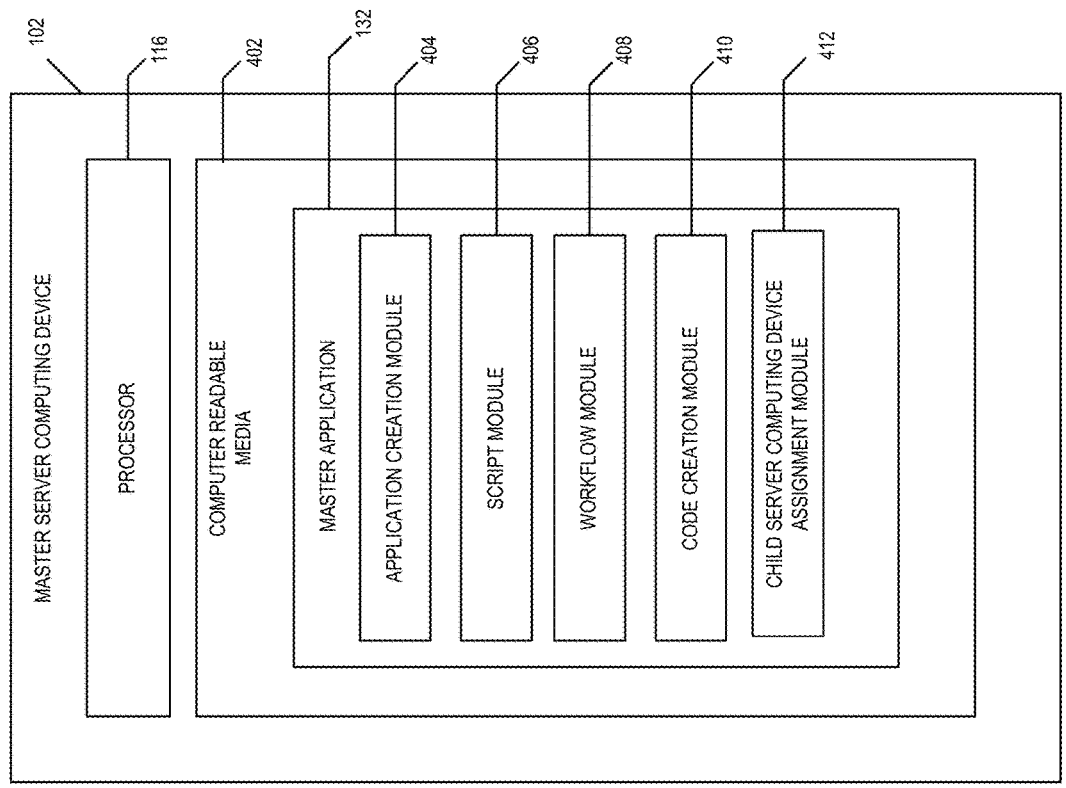
FIG. 4 illustrates a block diagram of a master server computing device of the system according to an example embodiment.
Figure 5A:
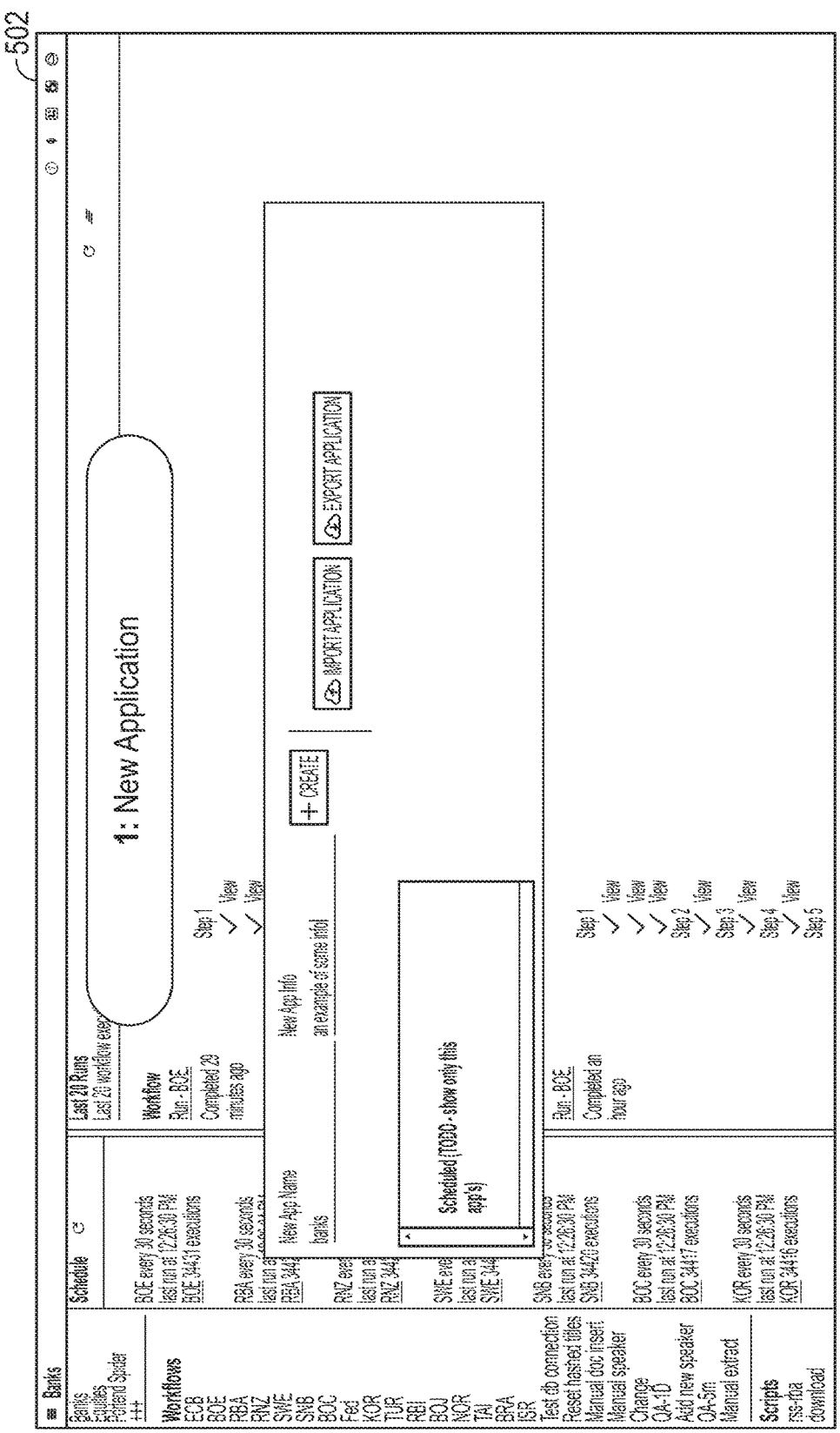
Figure 5C:
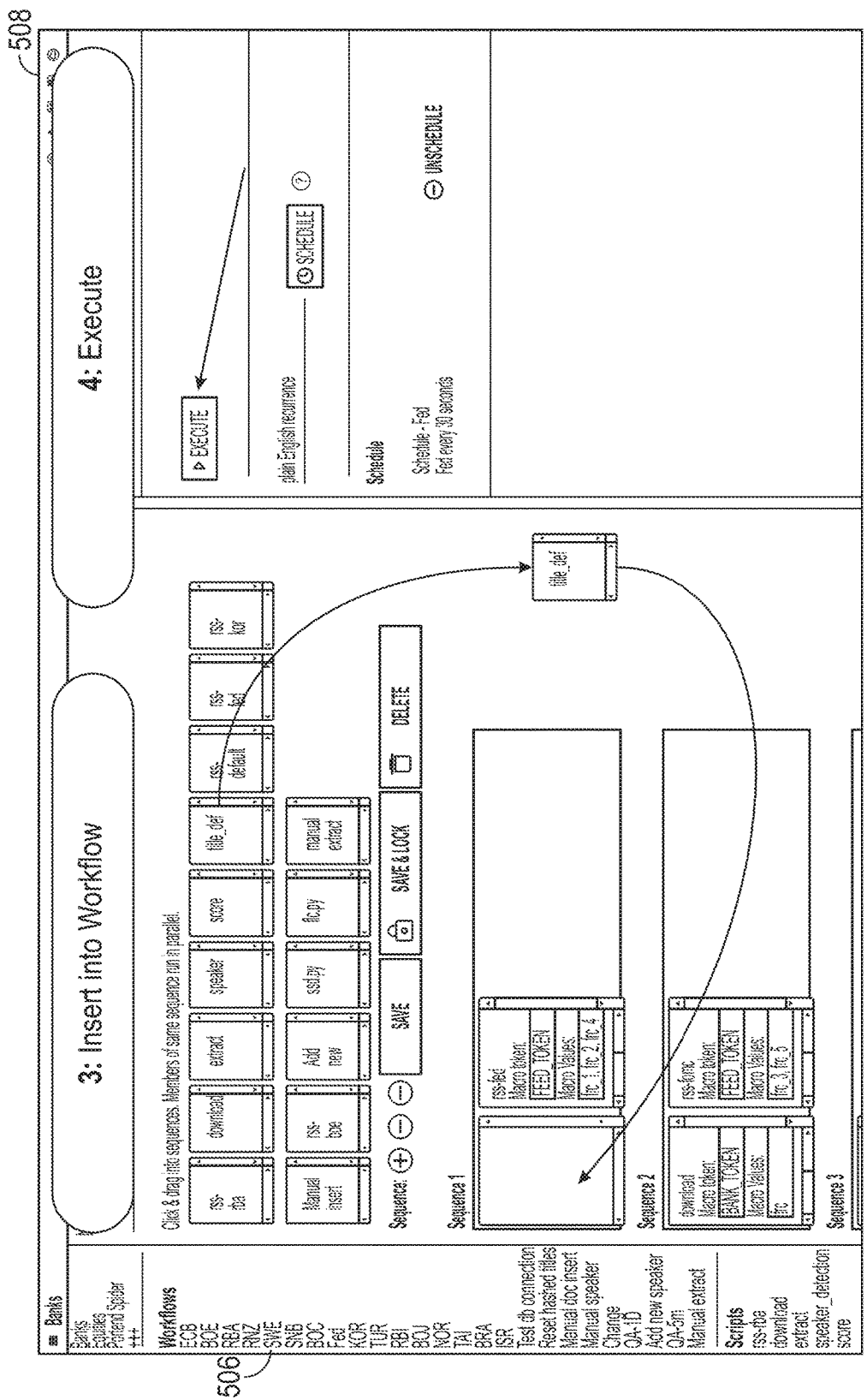
Figure 6C:
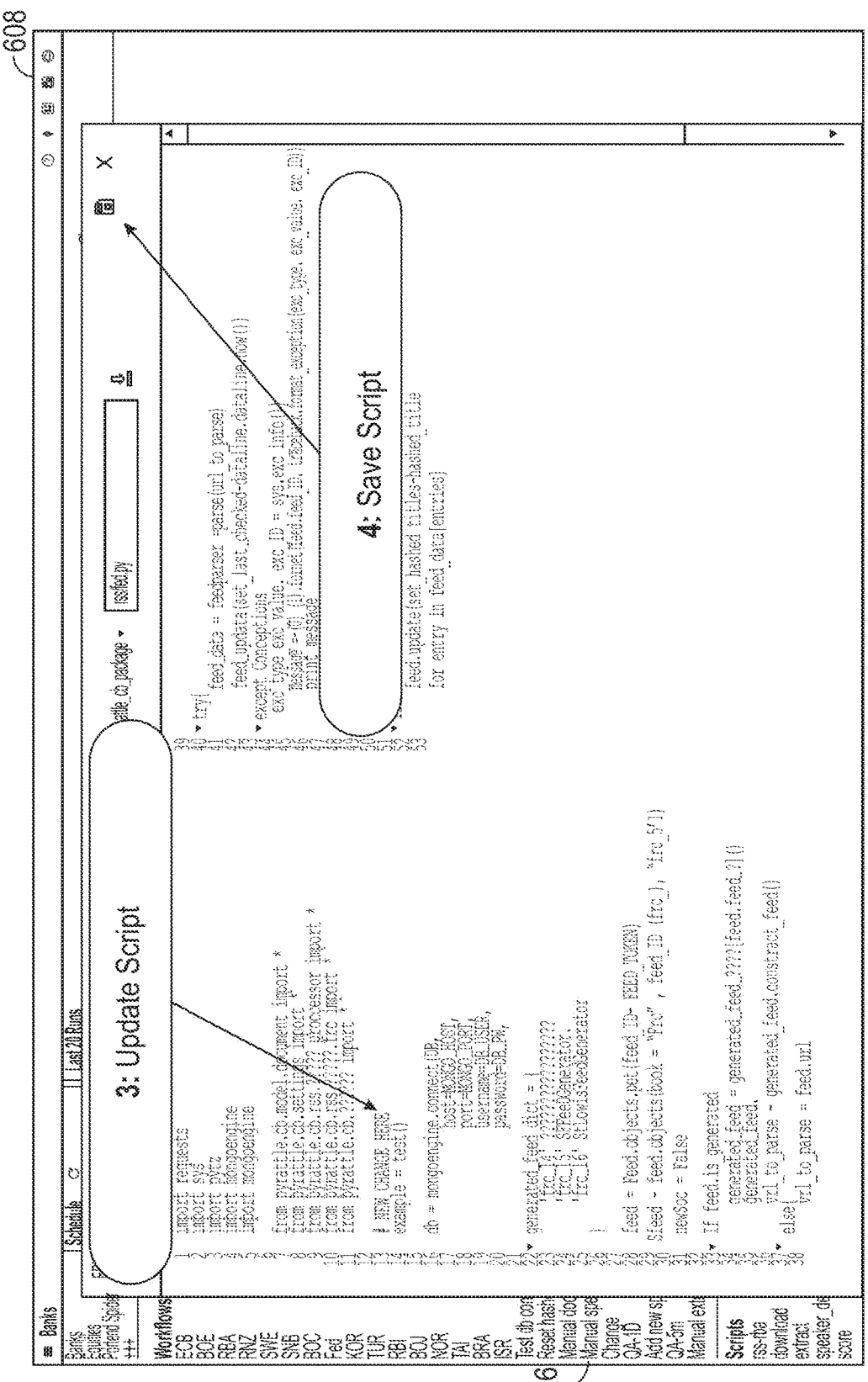
Figure 7B:
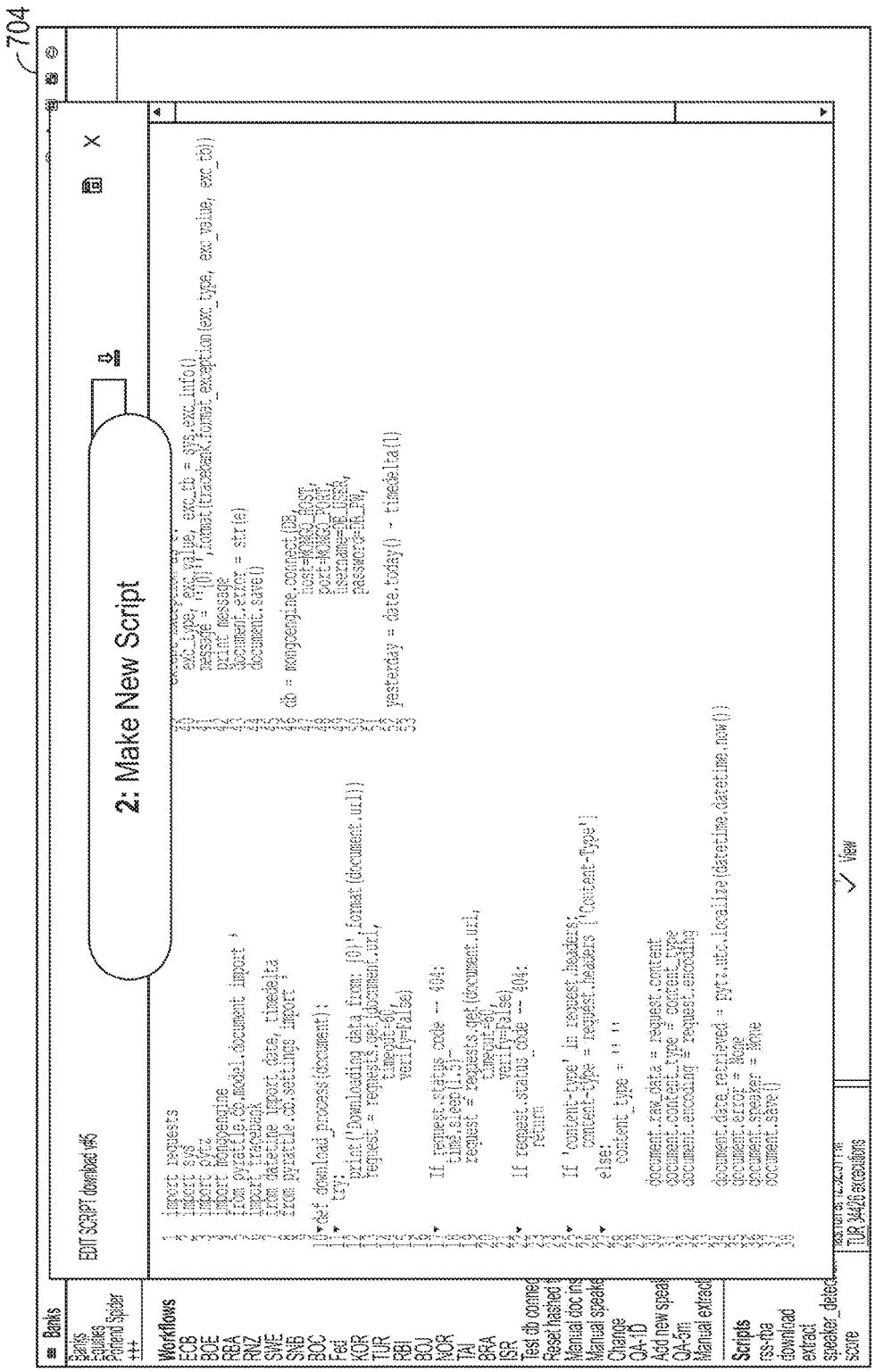
Figure 7C:
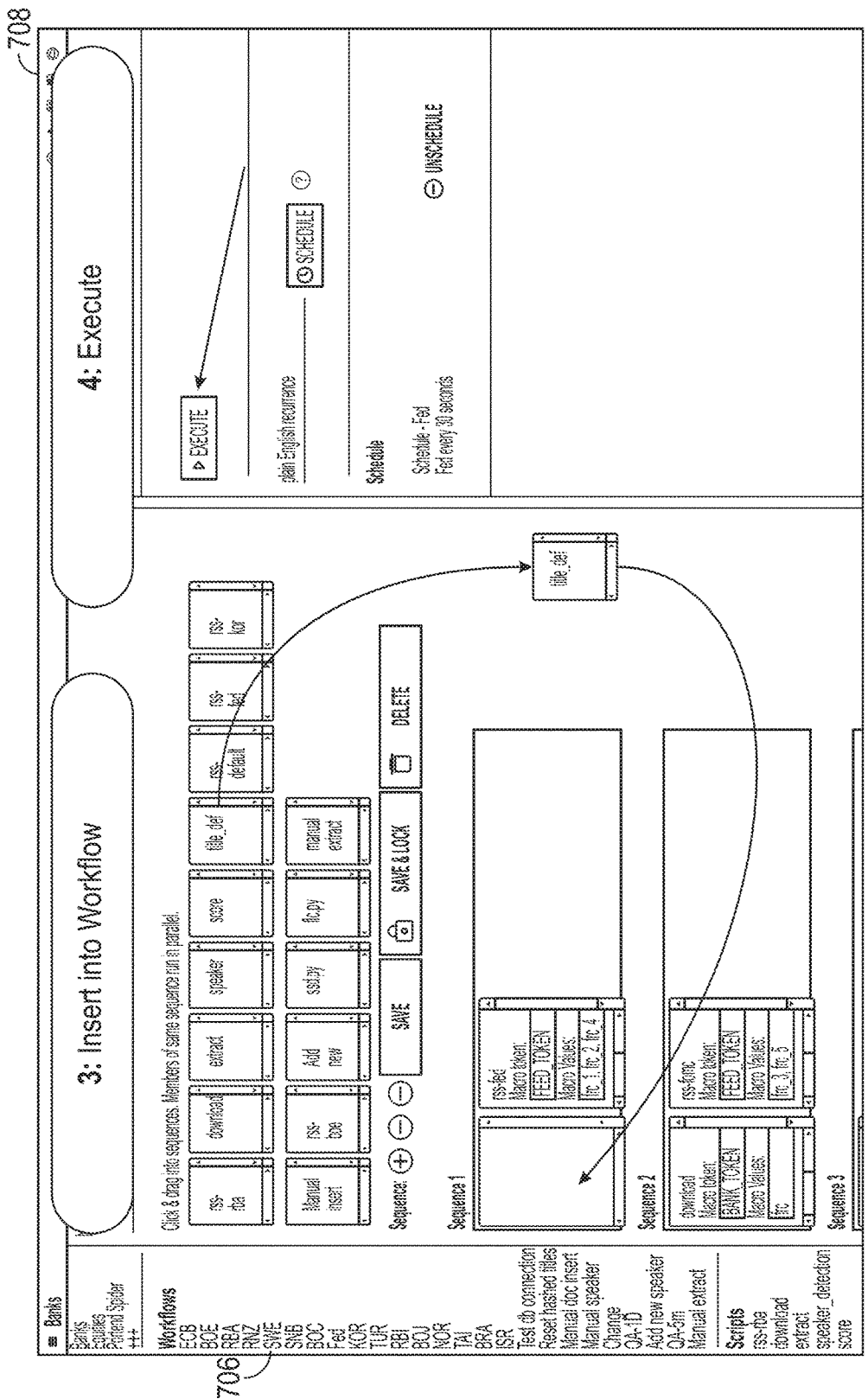
Figure 7D:
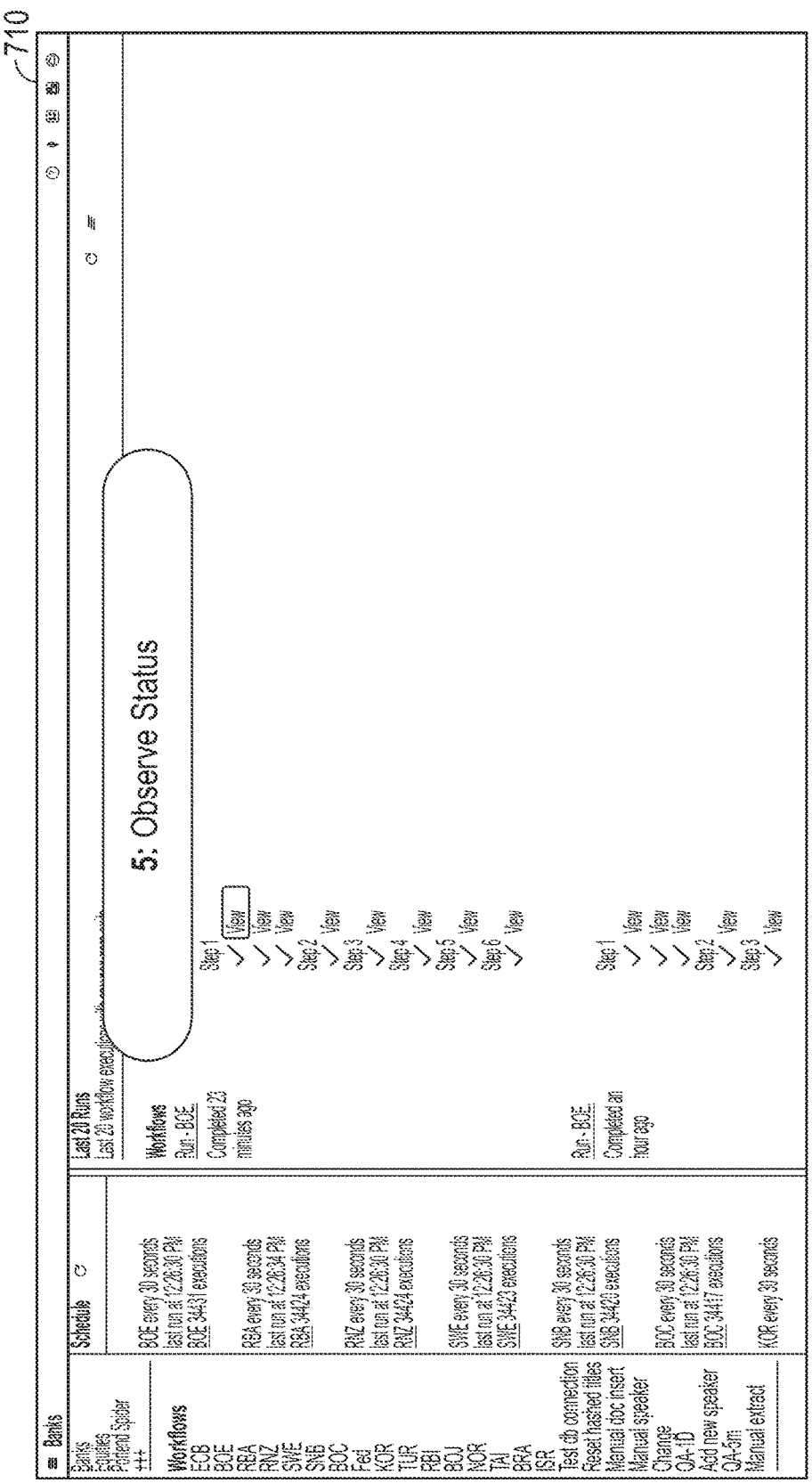
Figure 8A:
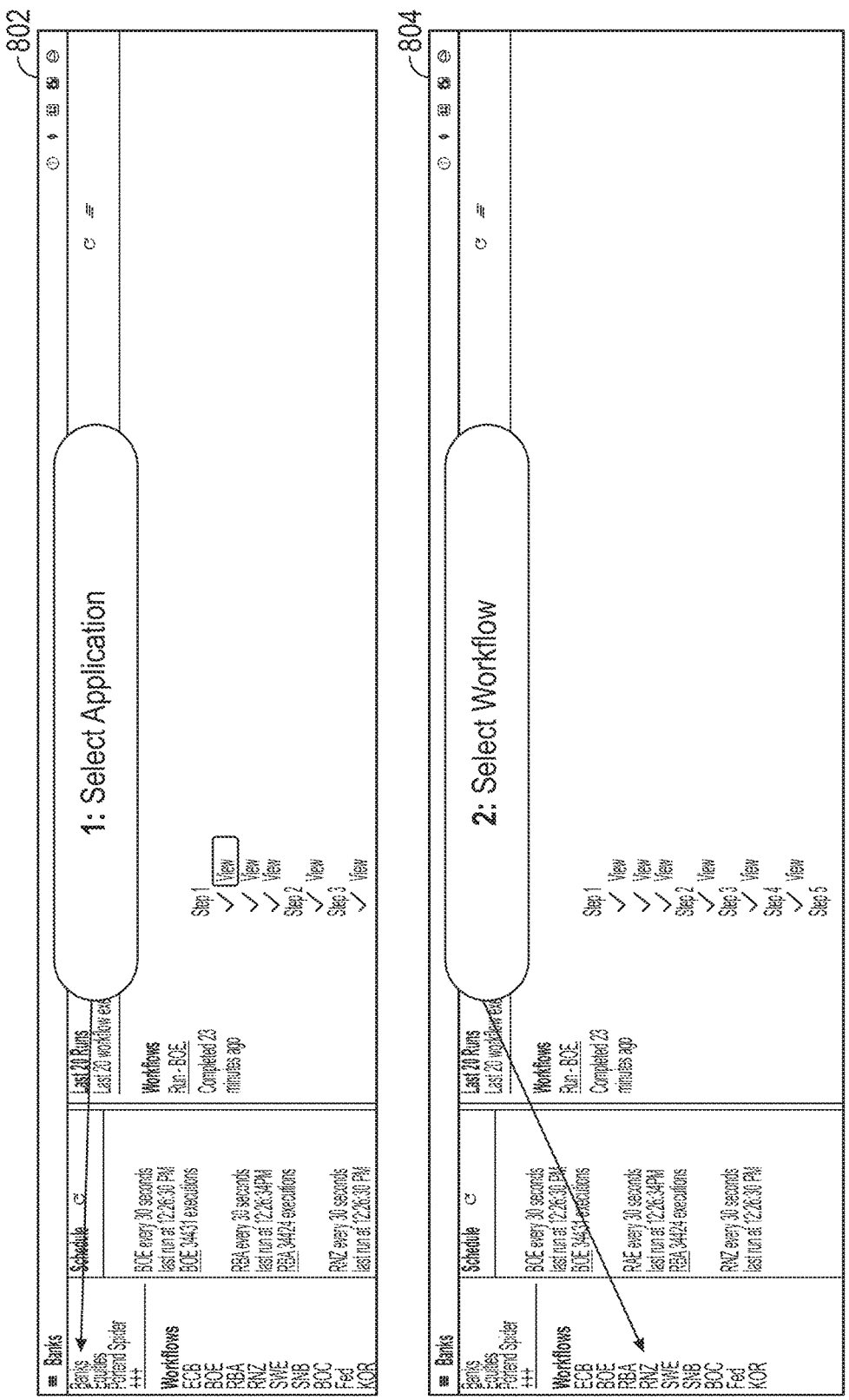
Figure 8B:
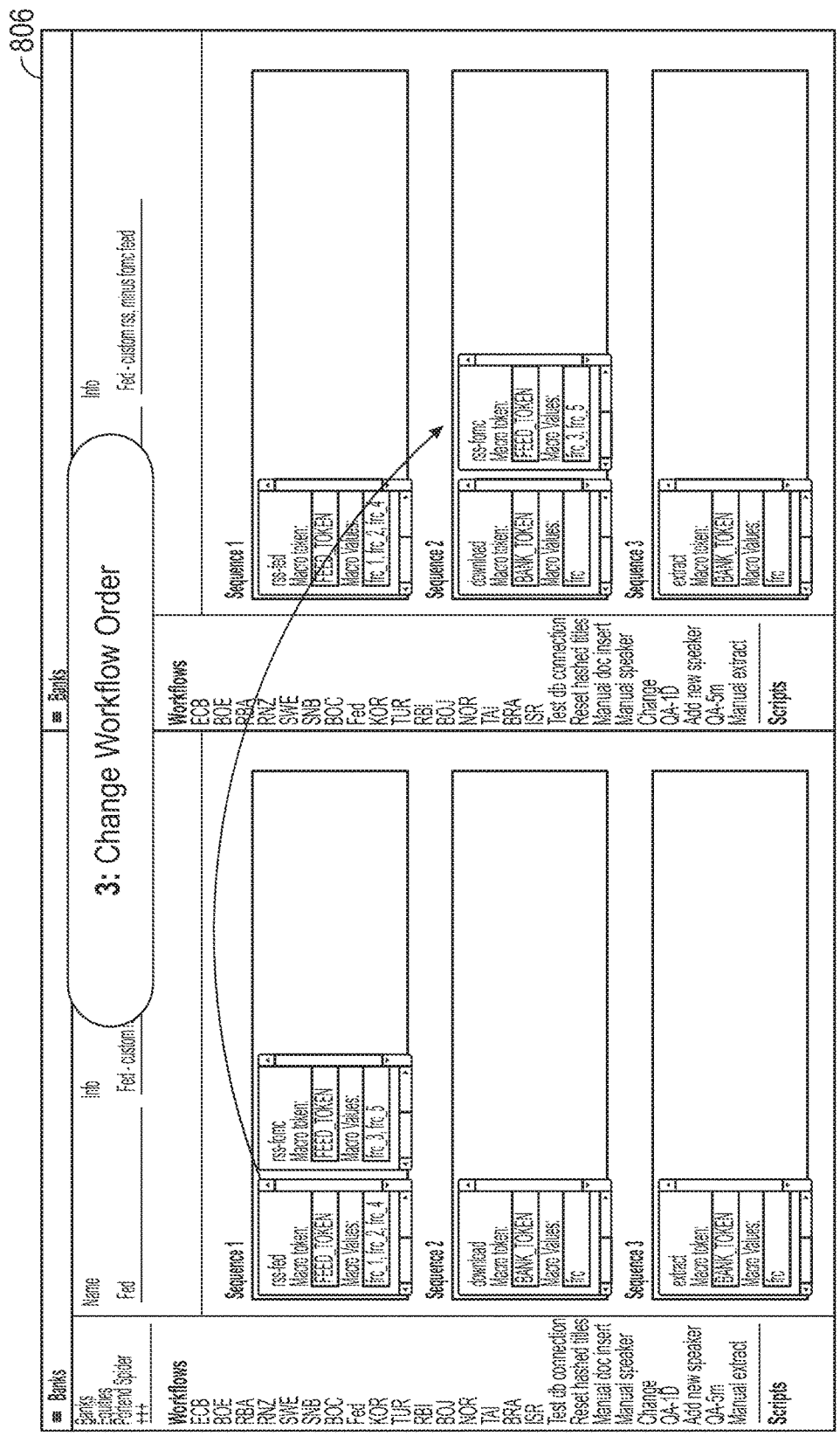
Figure 8C:
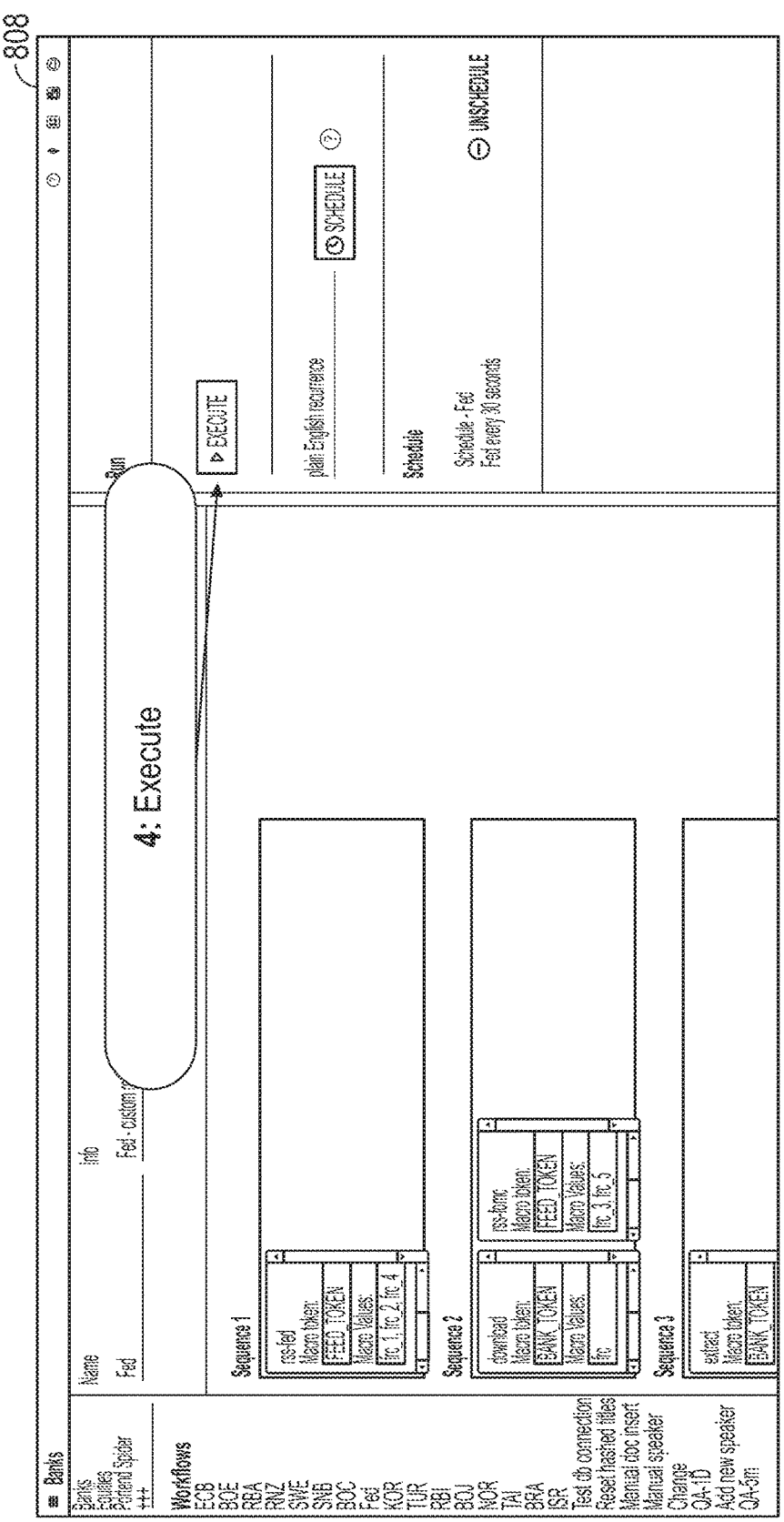
Figure 8D:
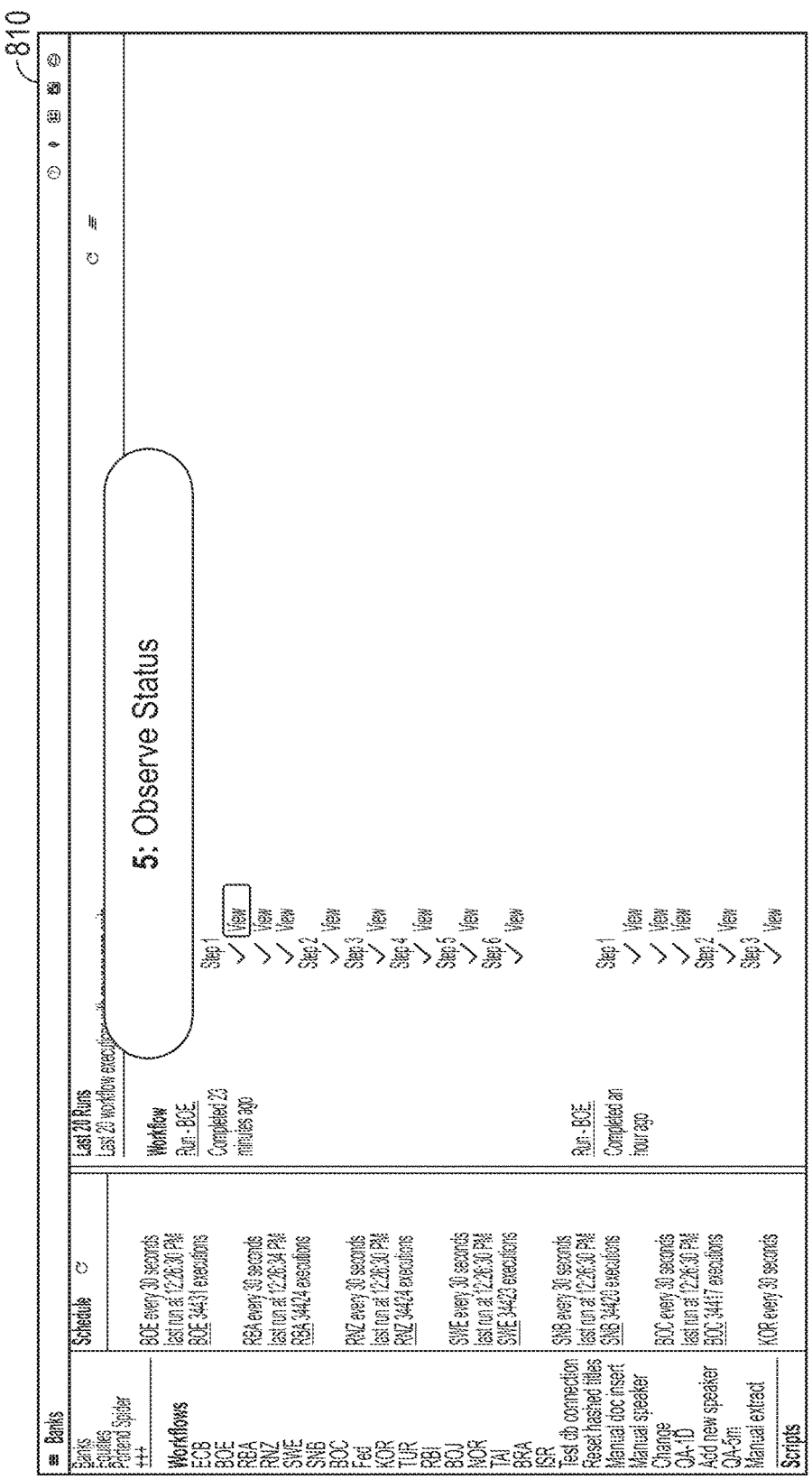

FIG. 4 illustrates a block diagram of the master server computing device 102 according to an example embodiment. The master server computing device 102 includes computer readable media (CRM) 402 in memory 118 on which the master application 138 or other user interface or application is stored. The computer readable media may include volatile media, nonvolatile media, removable media, non-removable media, and/or another available medium that can be accessed by the processor 116. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

As shown in FIG. 4, the master server computing device 102 may include an application creation module 404 for performing steps 302 and 304 and associated functionality as described with respect to FIG. 3 as discussed above. Additionally, the master application 138 may include a script module 406 for performing step 306 and associated functionality as described with respect to FIG. 3 as discussed above. In addition, the master application 138 may include a workflow module 408 for performing steps 308 and 310 and associated functionality as described with respect to FIG. 3 as noted above. Further, master application 138 may include a code conversion module 410 for performing steps 312 and 314 and associated functionality as described with respect to FIG. 3 as noted above. Additionally, the master application 138 may include a child server assignment module 412 for assigning at least one child server computing device 104 to execute the machine-readable and executable code as at least one job.

The system 100 converts abstracted code to machine-readable instructions, which is exemplary of the generative programming paradigm, a style of computer programming that automatically generates source code through the use of generic classes and constructs. The system 100 may use constructs genericized specifically to allow for the execution of multilingual, parallelized RPC operations in a data science context without the need to write any application-level service bus to do so. The system 100 may functionally map abstracted application code to machine-readable instruction sets defined within the generic constructs, which are then interpreted standardly by child server computing devices 104 in a RPC pool. In the field of statistics, random variables describe possible outcomes of interest. However, according to the system 100, abstracted application code illustrates possible executions of machine-readable code.

FIGS. 5A-5D illustrate an exemplary process for creation and development of an application according to the system 100. In a first step 502, a new application is created by a user of the client computing device 108. As an example, the user may use the user interface to input information associated with the new application and this may include a new application name and new application information. In a second step 504, scripts and associated code may be added to the application by the user of the client computing device 108. As an example, the user may manually enter text associated with the script, or the user may select a script that has already been created. The user may do this one or more times to create one or more scripts that are associated with the application. In a next step 506, a workflow may be created by the user of the client computing device 108 to execute the scripts. Then in step 508, the workflow may be saved and scheduled for execution by selecting a user interface element to execute the application. As an example, the user may schedule the application to execute every thirty seconds or at another interval such as once every twenty four hours. The master server computing device 108 may store information associated with the workflow in the database upon receipt from the client computing device 108. In step 510, after the application begins execution, results may be displayed and observed.

As shown in FIGS. 5A-5D, the client computing device 108 may transmit a request for an integrated development environment (IDE) user interface for creating an application to the master server computing device 102. In response to the request, the client computing device 108 may receive and display the IDE user interface on the display 132. The IDE user interface may be displayed using the browser 136 or using another application of the client computing device 108. The IDE user interface may include an application creation section that displays a user interface for creating an application, a code section that receives and displays text associated with a script, a script section that displays at least one user interface element including a list of at least one pre-written scripts, and a workflow section that displays at least one ordered step of the application and at least one script associated with each step of the application. Next, the client computing device 108 may receive application information entered into the user interface from a user and transmit the application information to the master server computing device 102 to be stored in the database 112. The application information may include a name of the application among other information such as a short description of the application.

Next, the user of the client computing device 108 may add at least one script to the application. The at least one script may be one of manually entered into the code section by the user and selected from the script section displaying the list of at least one pre-written scripts. The client computing device 108 may transmit the at least one script and the application information to the master server computing device 102 to be stored in the database 112. The user of the client computing device 108 may also provide a workflow. The client computing device 108 receives a workflow of the at least one ordered step of the application entered into the workflow section from the user. Each step may include at least one associated script. The master server computing device 102 may generate machine-readable and executable code from the application based on the workflow when the user of the client computing device 108 selects an execution user interface element such as a button that when selected transmits an instruction to begin generation of the machine-readable and executable code. In addition, the master server computing device 102 may schedule execution of the machine-readable and executable code based on input from the user to the client computing device 108.

Additionally, the client computing device 108 may receive a selection by the user of a script from the list of at least one pre-written scripts, the script performing a particular function, and receive a drop of the script into a particular step in the workflow of the application. Alternatively, the client computing device 108 may receive a selection by the user of a first script written in a first programming language that performs a first function and receive a selection by the user of a second script written in a second programming language that is different from the first programming language. Further, the client computing device 108 may receive a selection by the user of a first script that performs a first function and receive a selection by the user of a second script that performs a second function, and receive a drop of the first script and the second script into a step in the workflow of the application to execute both the first script and the second script in parallel.

FIGS. 6A-6D illustrate illustrates modification of a production application using the system 100. In a first step 602, a user may navigate to the application using the user interface displayed by the display 132 of the client computing device 108. In a next step 604, using the client computing device 108, the user may select a script of the application to modify. In step 606, the user may update the script and save the script, which saves any changes made to the script and stores changes in the database 112. In step 608, the user may select a user interface element to save the changes to the script. In step 610, after the application begins execution, results may be displayed and observed. In other words, the client computing device 108 may transmit a request to modify at least one script of the application to the master server computing device 102. The client computing device 108 may receive the IDE user interface from the master server computing device, receive an update to the at least one script entered into the user interface from the user, re-generate machine-readable and executable code for the application based on a selection of the execution user interface element, and re-schedule execution of the machine-readable and executable code based on input provided by the user.

FIGS. 7A-7D illustrate addition of a new feature to a previously created application using the system 100 according to an exemplary embodiment. In a first step 702, using the client computing device 108, the user may navigate to the application using the user interface displayed on the display 132 of the client computing device 108. Next, in step 704, the user may create a new script to perform a new function or add new features to the application. In step 706, the user may add the script to the workflow using the user interface displayed on the display 132 of the client computing device 108 and save the application. In step 708, the user may select a user interface element to execute the application. In step 710, after the application begins execution, results may be displayed and observed.

FIGS. 8A-8D illustrate modification of application logic in a previously created application using the system 100 according to an exemplary embodiment. In a first step 802, the user may navigate to the application using the user interface displayed on the display 132 of the client computing device 108. In a next step 804, the user may select the workflow for the application and in step 806, the user may drag one of the scripts to a different location in the user interface and may change the order of the scripts. The user may then save any changes. The master server computing device 102 may receive the changes and store the changes in the database 112. In step 808, the user may select a user interface element to execute the application. In step 810, after the application begins execution, results may be displayed and observed. In other words, the client computing device 108 may transmit a request to modify the workflow to the master server computing device 102. The client computing device 108 may receive the IDE user interface from the master server computing device 102, receive an update to the workflow entered into the user interface by the user, re-generate machine-readable and executable code for the application based on a selection of the execution user interface element, and re-schedule execution of the machine-readable and executable code based on input provided by the user.

Figure 9:
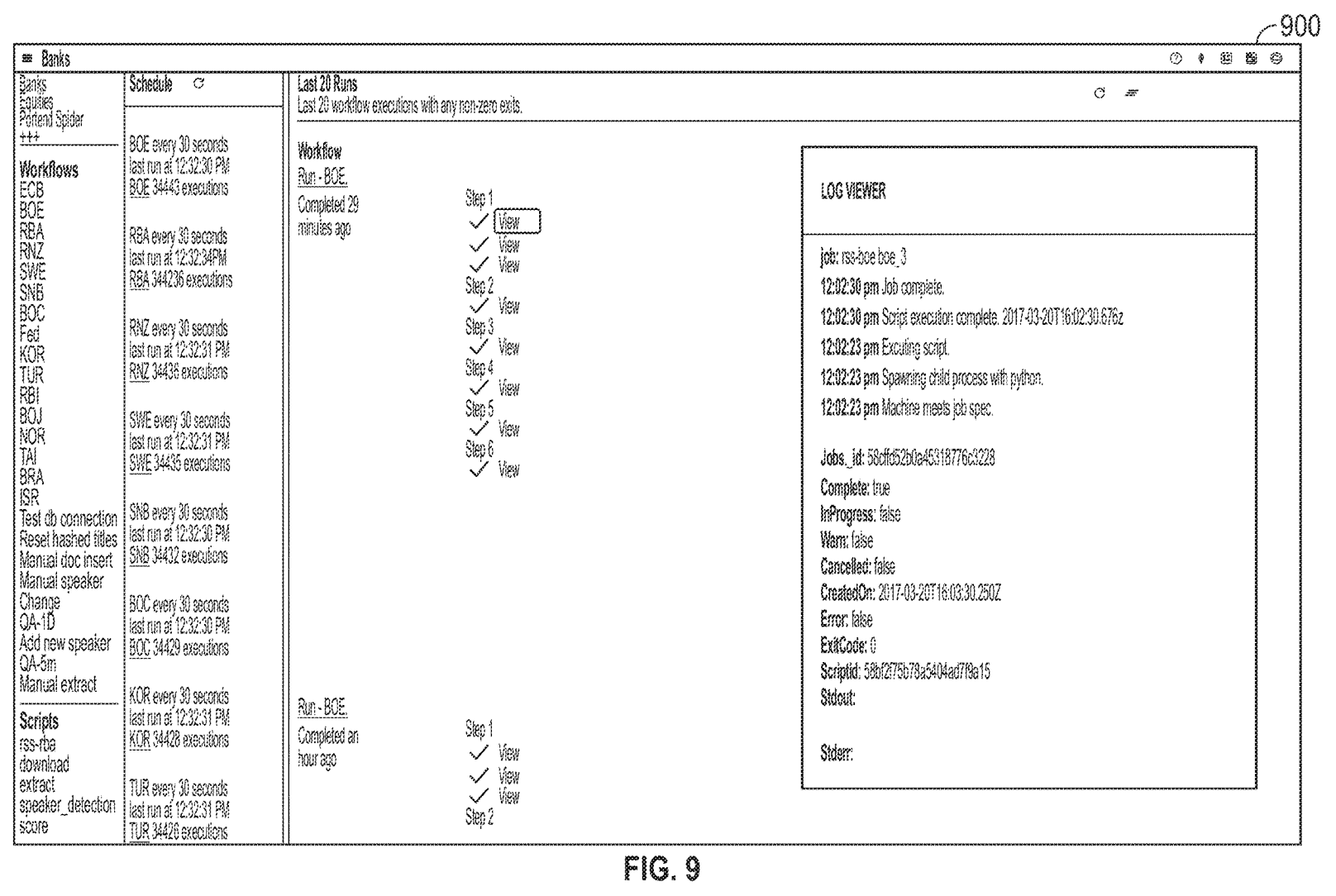

FIG. 9 shows a screenshot 900 of a user interface that provides status information and logs from applications associated with the system 100 according to an example embodiment. As an example, the client computing device 108 may display on the display 132 status information associated with the application including a particular interval of time when the application is scheduled to execute.

Figure 10:
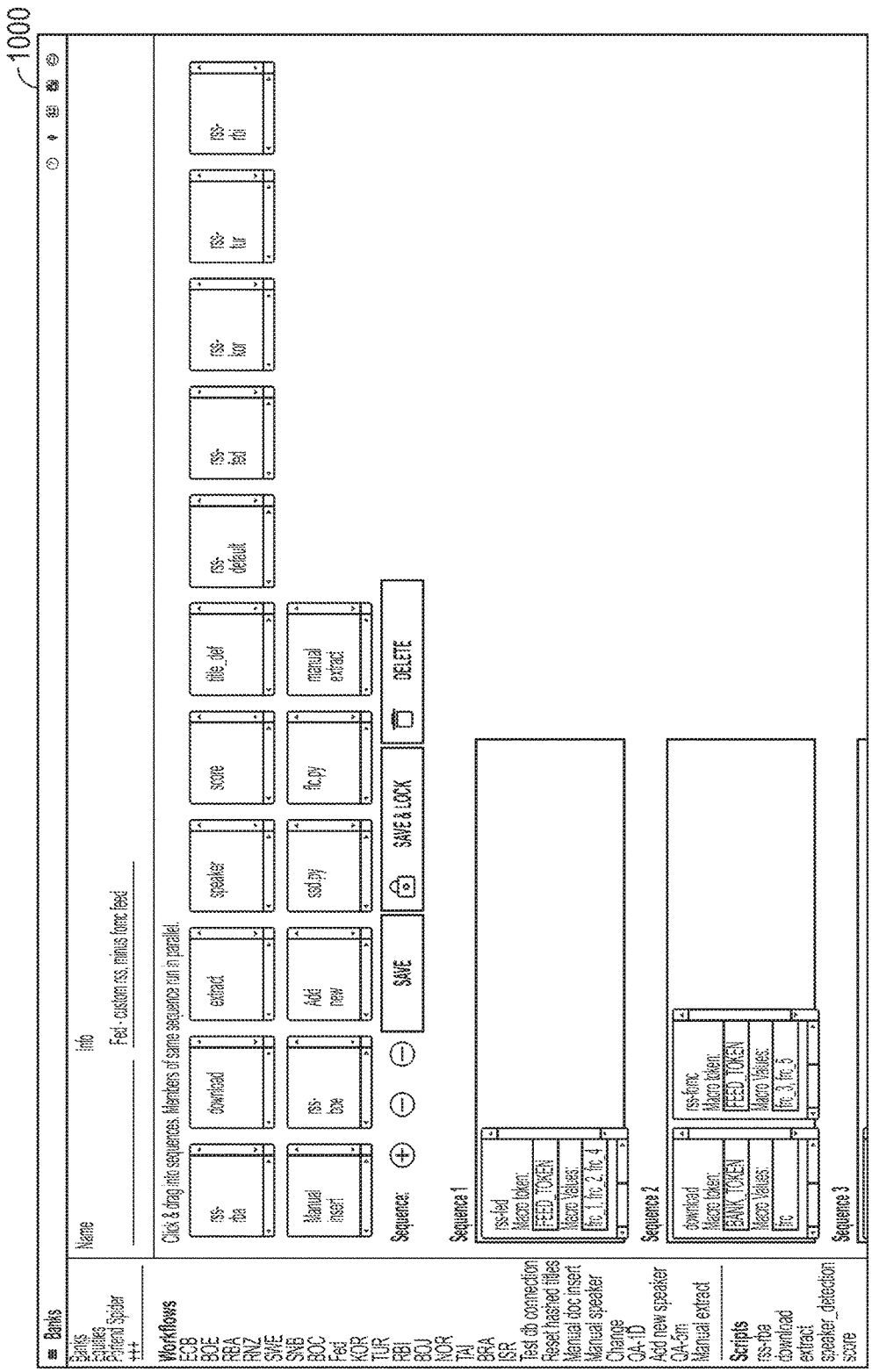

FIG. 10 shows a screenshot 1000 of a user interface for constructing a workflow from scripts. The usual use of application-level code is to execute a predetermined set of tasks, all of which are defined at the machine-readable or source code level. This is different from the system 100. For example, consider the development of an extract-transform-load (ETL) application which extracts raw text data from a database, transforms the raw text into a cleaned term frequency matrix, and then saves the term frequency matrix back to the database. The application must accept and process new documents in real time.

As shown in FIG. 10, the name of the application is "Fed" and the "Fed" application has a short description such as "Fed—custom rss, minus fomc feed." The user interface that is shown in FIG. 10 shows the name of three different applications including "banks," "equities," and "Portend Spider." In addition, the user interface that is shown in FIG. 10 also shows a list of workflows including "ECB," "BOE," "RBA," "RNZ," "SWE," "SNB," "BOC," "Fed," "KOR," "TUR," "RBI," "BOJ," "NOR," "TAI," "BRA," "ISR," "Test db connection," "Reset hashed titles," "Manual doc insert," "Manual speaker," "change," "QA-1D," "Add new speaker," "QA-5m," and "Manual extract." In addition, the user interface that is shown in FIG. 10 shows a list of scripts including "rss-rba," "download," "extract," "speaker_detection," "score," and others. These scripts are also shown as selectable user interface elements in the script section of the user interface. The user may select one of the user interface elements and click and drag the user interface element that represents the script into one of the sequences shown in the user interface. In addition, the user may select one of the user interface elements to create a new sequence ("+"), and may delete one of the sequences by selecting a user interface element ("—"). In addition, the user may also select one of the other user interface elements such as "Save," "Save and Lock" and "Delete" shown in the user interface. These user interface elements allow a user to save the current state of the sequences to the database 112, or save and then prevent further changes to the workflow, or to remove the sequences from the database.

Using conventional solutions, the developer may create a boilerplate application framework that allows for event-driven script execution. The developer may ensure that the application is properly set up for logging, monitoring, load management, error handling, database interfacing, and deployment. After spending the weeks to months to create and test the framework, the developer may write the ETL operation code in a particular language. For a computationally-intensive task such as this, the developer must determine how to parallelize the task across a number of servers via RPC. The parallelization code may be written using the chosen language's multiprocessing capability. The developer must then set up a distributed processing infrastructure that communicates properly with the application, which involves the development of testing tools, deployment tools, and dedicated server space. The developer may then build an event handler to instruct the ETL operation to run on receipt of new data. The developer may then deploy the application into production. If the developer wants to change the application's functionality, the process may begin over again, because any change in functionality demands an updated framework in which to perform the RPC operations. Thus, the application code is not flexible.

According to the distinguishing features of the system 100, the developer may create a new application using the graphical user interface displayed on the display 132 of the client computing device 108. The developer may create a new workflow that may check for new documents and execute an ETL script for the documents when they are found to exist. The developer may use the graphical user interface to write a script that may check for new documents using a database query and trigger code if any new documents are found. The developer may use the system 100 to parallelize over any new documents. The developer may insert ETL code for a document into the graphical user interface and may schedule the workflow to be executed (e.g., check for new documents) at a particular interval of time such as every three seconds. If the developer is to make changes, the developer may open one or more scripts using the graphical user interface, make a change, and save the changes. The same scheduling and logic may be used to execute the application. These features abstract the application code from machine-readable instructions and provide improvements in flexibility, simplicity, and speed.

As a result, the system 100 may provide numerous benefits for experienced and novice programmers by allowing them to leverage an event driven, distributed computing architecture. As an example, as shown in FIG. 11, a user may run scripts in parallel using point-and-click parallelization.

Figure 11:
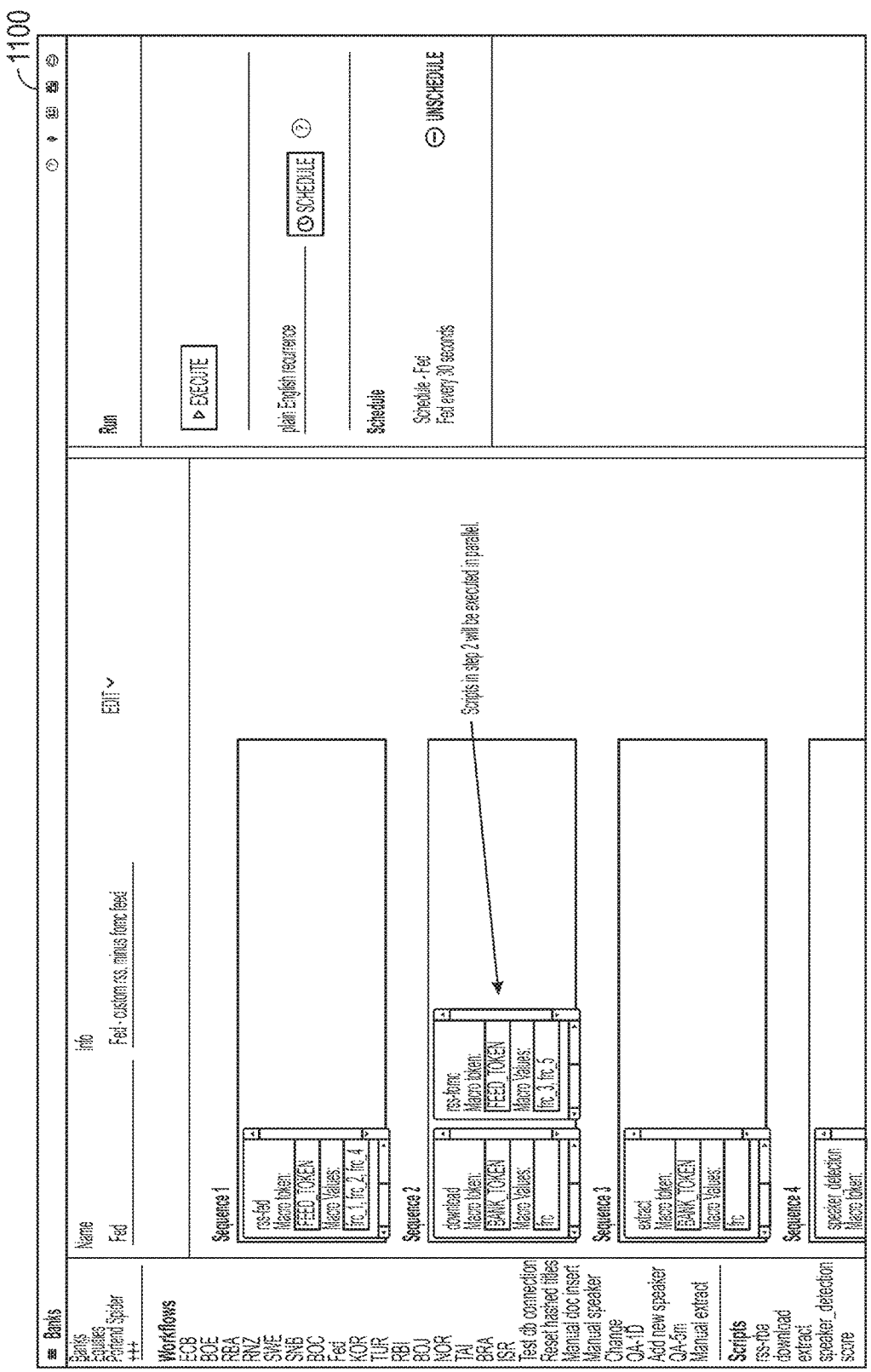

FIG. 11 shows a screenshot 1100 of a user interface for selecting scripts to run in parallel according to an example embodiment. To run scripts in parallel, the user may align the scripts in parallel on a same step using the graphical user interface displayed on the display 132 of the client computing device 108. As shown in FIG. 11, the user has aligned two scripts to execute in parallel. The user does not have to set up any distributed processing infrastructure to execute these scripts in parallel. Rather, the master server computing device 102 determines and selects one or more child server computing devices 104 to execute the scripts in parallel.

As shown in FIG. 11, the "Fed" application may be run when the user selects the "Execute" button that is shown in the user interface and may schedule the "Fed" application to run. As shown in FIG. 11, the "Fed" application is scheduled to run every thirty seconds. In addition, the user may select the "Unschedule" user interface element to stop the scheduled execution of the "Fed" application.

In addition, users may utilize the system 100 to leverage macro expansion to generatively produce scripts, which are then executed in parallel. The user may define a macro token and macro values at the workflow level.

Figure 12:
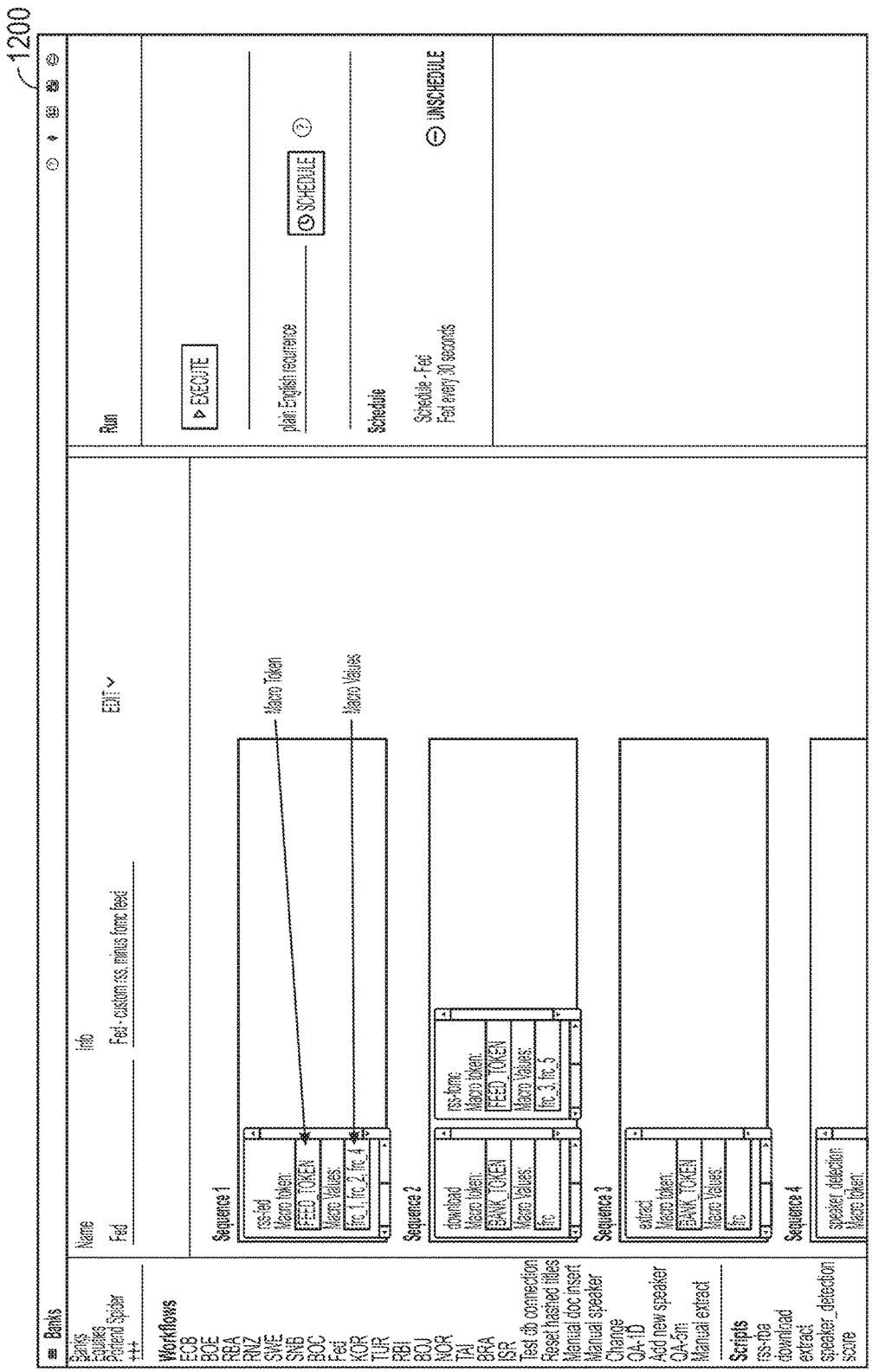

As an example, FIG. 12 shows how a user may define a macro token named FEED_TOKEN in the first step and several macro values including frc_1, frc_2, and frc_4. FIG. 12 illustrates a screenshot 1200 of a user interface for defining a macro token and macro values according to an example embodiment. Upon execution, the system may generate three scripts, one for each macro token, and execute the scripts in parallel. On each workflow execution, a new script may be created for each macro value. Each new script may be created from a template from a base script with the macro token being replaced by the macro value. As an example, if the script is rss_feed, when the workflow is executed, the system 100 may automatically generate three scripts and execute them in parallel by distributing the machine-readable executable code to one or more child server computing devices 104.

In some examples, developers may want to have steps occur later in an application's workflow respond to output of earlier steps. The system 100 may allow users to build application-level logic into the workflow. As an example, the user may embed a standardized exit code into the script to have the system 100 perform particular functions. As an example, an exit code of "0" may indicate that the script did not have any errors and to halt the workflow. An exit code of "1" may indicate that an error occurred and to halt the workflow. An exit code of "212" may indicate to continue the workflow asynchronously. An exit code of "202" may indicate to loop the current script.

As an example, a user may create an application using the system 100 to parse newly detected documents. If new documents are not detected, the application should not continue to parse the documents. If new documents are detected, the application should continue. Example pseudo-code is as follows:

Step 1: Detect
Script 1: Detect new documents
Look for new documents.
new_docs=detect_new_documents( )
If does are found, save and tell Portend to continue workflow.
  if new_does:
  database.insert(new_docs)
  sys.exit(212)
  # Otherwise, end workflow.
  sys.exit(0)
Step 2: Parse
Script 1: Parse documents
Get new does from database.
new_docs=query_new_docs( )
For each doc, parse and save.
for doc in new_does:
parsed=parse(doc)
database.insert(parsed)

FIG. 13 illustrates a screenshot 1300 of a user interface that shows an example status view report error output that may be provided by the system 100 according to an example embodiment. As shown in FIG. 13, the application "BOE" was executed and completed execution twenty-nine minutes ago. As shown in FIG. 13, BOE may include step one (including three scripts that each show a checkmark), step two (including one script that shows a checkmark), step three (including one script that shows a checkmark), step four (including one script that shows a checkmark), step five (including one script that shows a checkmark), and step six (including one script that shows a checkmark). FIG. 13 also shows a log viewer that includes a name of the job—"rss-boe boe_3." The log in FIG. 13 shows the following "Job complete.", "Script execution complete.", "Executing script.", "Spawning child process with python", "Machine meets job spec."

As another example, a user may create an application using the system 100 to detect and parse documents using distributed processing that is a variant of the example shown above. The user may distribute the processing of the documents in parallel using the system 100. Example pseudocode is as follows:

Step 1: Detect
Script 1: Detect new documents
Look for new documents.
new_docs=detect_new_documents( )
If does are found, save and tell Portend to continue workflow.
  if new_does:
  doc_ids=database.insert(new_docs)
  Portend.macro_expansion("DOC_ID", doc_ids)
  sys.exit(212)
  # Otherwise, end workflow.
  sys.exit(0)
Step 2: Parse
Script 1: Parse a document
Get new does from database.
new_doc=query_one_doc_by_id("DOC_ID")
For one doc, parse and save.
parsed=parse(new_doc)
database.insert(parsed)

Figure 14:
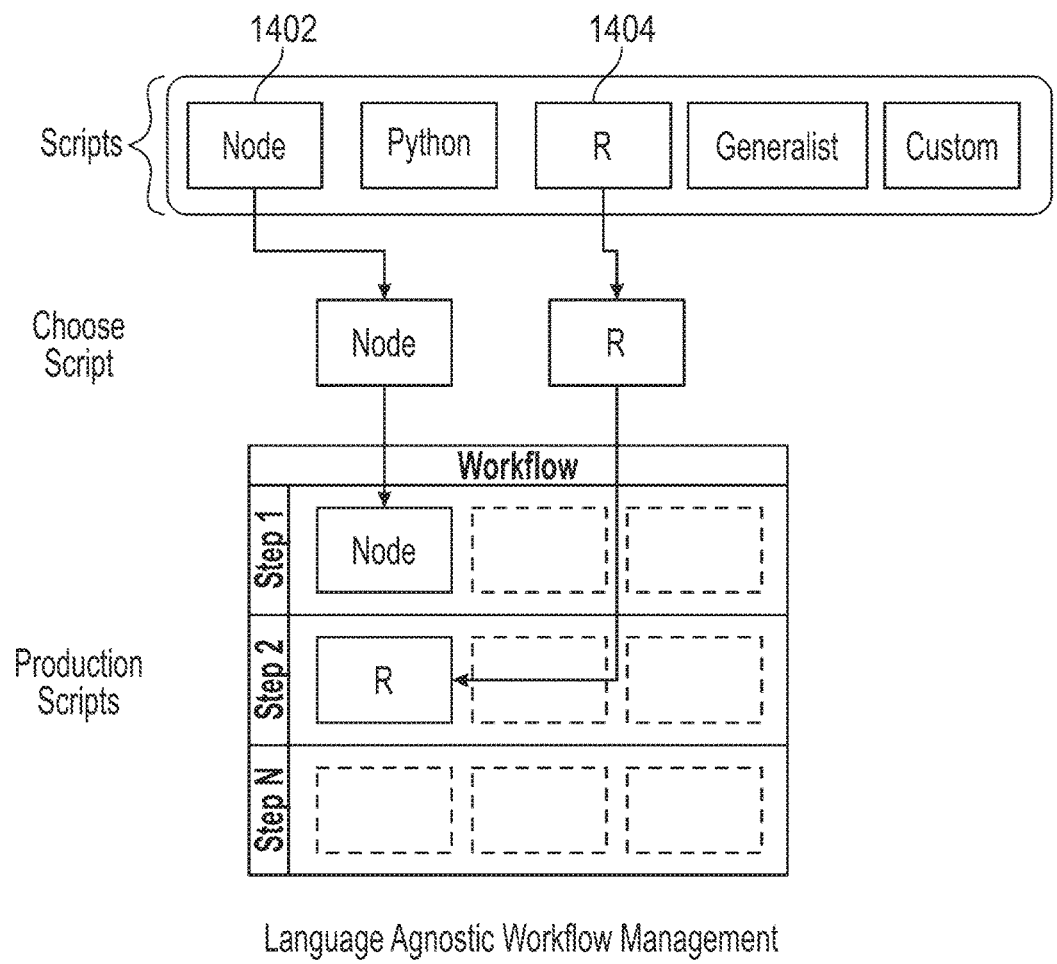
FIG. 14 illustrates language agnostic workflow management of the system for generative programming according to an example embodiment.

Additionally, the system 100 allows users to construct applications using a plurality of different programming languages. As shown in FIG. 14, the system may allow the user to integrate functionality from several different languages. FIG. 14 shows language agnostic workflow management of the system for generative programming according to an example embodiment. As shown in FIG. 14, the scripts may be written in one or more different languages. As an example, a first script may be a Node script 1402 and a second script may be an R script 1404. The user may select the Node script 1402 and insert the node script in a first step of the workflow. The user may select the R script 1404 and insert the R script into a second step of the workflow.

Nearly any programming language can be utilized with the system 100. Both interpreted and compiled languages can be used. This is inclusive of, but not limited to, languages such as PYTHON, R, bash, Julia, JAVASCRIPT (all variants), Go, PERL, C/C++, Fortran, JAVA, SQL command utilities, and RUBY® are a few examples. If the language can be invoked via a command line call to execute the script, the user can extend the system 100 to utilize the language in the script.

As another example, the user may create an application using the system 100 to detect, parse, and compute regression. Example pseudocode is as follows:

Step 1: Detect
Script 1: Detect new documents (language: Python)
Look for new documents.
new_docs=detect_new_documents( )
If does are found, save and tell Portend to continue workflow.
  if new_does:
  doc_ids=database.insert(new_docs)
  Portend.macro_expansion("DOC_ID", doc_ids)
  sys.exit(212)
  # Otherwise, end workflow.
  sys.exit(0)
Step 2: Parse
Script 1: Parse a document (language: Python)
Get new does from database.
new_doc=query_one_doc_by_id("DOC_ID")
For one doc, parse and save.
parsed=parse(new_doc)
database.insert(parsed)
sys.exit(212)
Step 3: Regression
Script 1: Do the regression (language: R)
Get does from database.
does←database$query("docs")
doc_features←sapply(docs, function(x) {return(count(split(x$text)))})
Get dependent variable data from database.
outcome←database$query("outcome")
Regress DV on doc text features.

lm1←lm(outcome~doc_features)
results←coef(lm1)[c(1)]
Save result to database.
database$save("results", results)

The master server computing device 102 may manage the flow of jobs by converting client instructions to machine-readable distributed jobs. The master server computing device 102 may then distribute the jobs. The master server computing device 102 may receive information associated with the jobs to pinpoint bugs, measure efficiency, and declare workflows finished. A client computing device 108 may access the system 100 by connecting and communicating with the master server computing device 102. The master server computing device 102 may transmit the user interface to the client computing device 108 through which the user of the client computing device 108 may write and store scripts, link scripts together in data analysis pipelines known as workflows to provide drag-and-drop application construction and on-the-fly code editing. Additionally, the user of the client computing device 108 may execute workflows, track the status, errors, and completion of executed workflows, generate summary statistics for the performance of completed workflows, and perform system management operations, such as cleaning a cache of the system 100.

Additionally, the master server computing device 102 may convert workflow representations into machine-readable instructions, respond to status reports from child server computing devices 104, and scale a size of a pool of child server computing devices consummate with workload.

In one example, a client computing device 108 may request the status of one or more applications that are being executed by the system 100. The client computing device 108 may send a request for a status view from the master server computing device 102 and the master server computing device 102 may query the database 112 to assemble a report of most recent workflows, and jobs run, in addition to status information and logs associated with the jobs, workflows scheduled to run, workflows available for each application, and scripts associated with each application.

A user of a client computing device 108 may submit a request to the master server computing device 102 to create a new application. The client computing device 108 may request a user interface associated with creating the new application. The user of the client computing device 108 may input new application information and transmit the new application information to the master server computing device 102. This information may POST to the master server computing device 102 and the master server computing device 102 may save the new application in the database. The graphical user interface may refresh and the master server computing device 102 may transmit status information to the client computing device.

Additionally, the user of the client computing device 108 may add one or more scripts to the new application. The user of the client computing device may select a user interface element associated with "New Script" such as a button or other user interface element, which displays an IDE for editing code. The user of the client computing device 102 may name the script and input code using the IDE. The client computing device may 108 transmit the code associated with the script to the master server computing device 102 and the master server computing device 102 may store a script associated with the application. The graphical user interface may refresh and display the script in a list of scripts available.

Next, the user of the client computing device 108 may string scripts together into a workflow. The user of the client computing device 108 may select a user interface element associated with "New Workflow" such as a button or other user interface element, which displays a drag-and-drop editor for the workflow. The drag-and-drop editor may be populated with data from the database. As an example, for each script associated with the application, a script "card" may be injected into the DOM. The user of the client computing device 108 may use the drag-and-drop editor to drag the script card from the list of scripts into the workflow. This may scaffold out a JSON structure that may represent a workflow. The user of the client computing device 108 may save the workflow and the client computing device 108 may transmit the JSON structure to the master server computing device 102.

Next, the user of the client computing device 108 may schedule an execution of the workflow. When the workflow is to be executed or scheduled to be executed, the master server computing device 102 may create a scheduling event that may be associated with a workflow object ID. The master server computing device 102 may determine that there is a newly scheduled ID and generatively produce machine-readable code in the form of a job. As a result, the user may view results associated with the application. The code associated with the application may be executed by the child server computing devices 104, which transmit log information to the master server computing device 102.

Figure 15A:
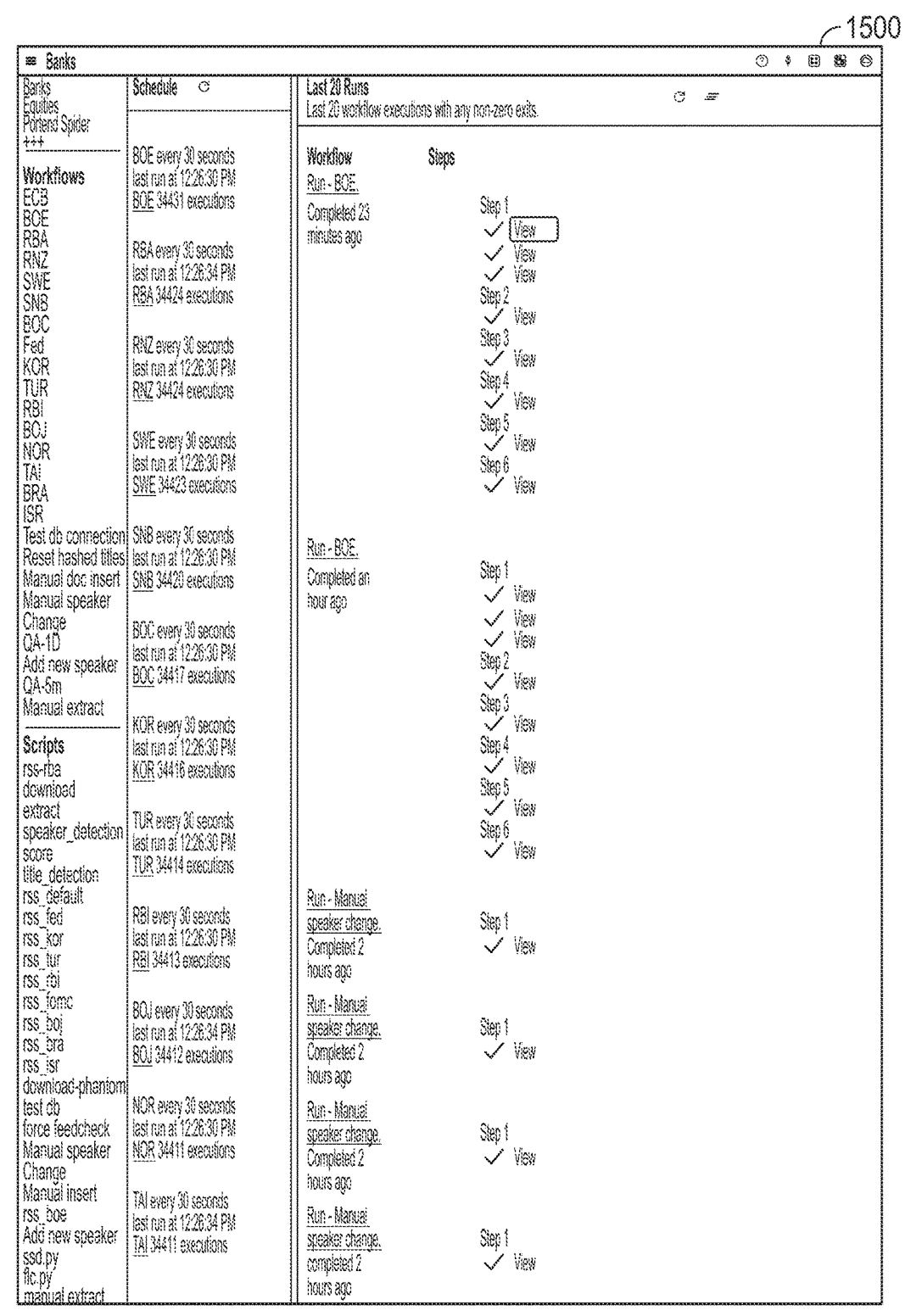
Figure 15B:
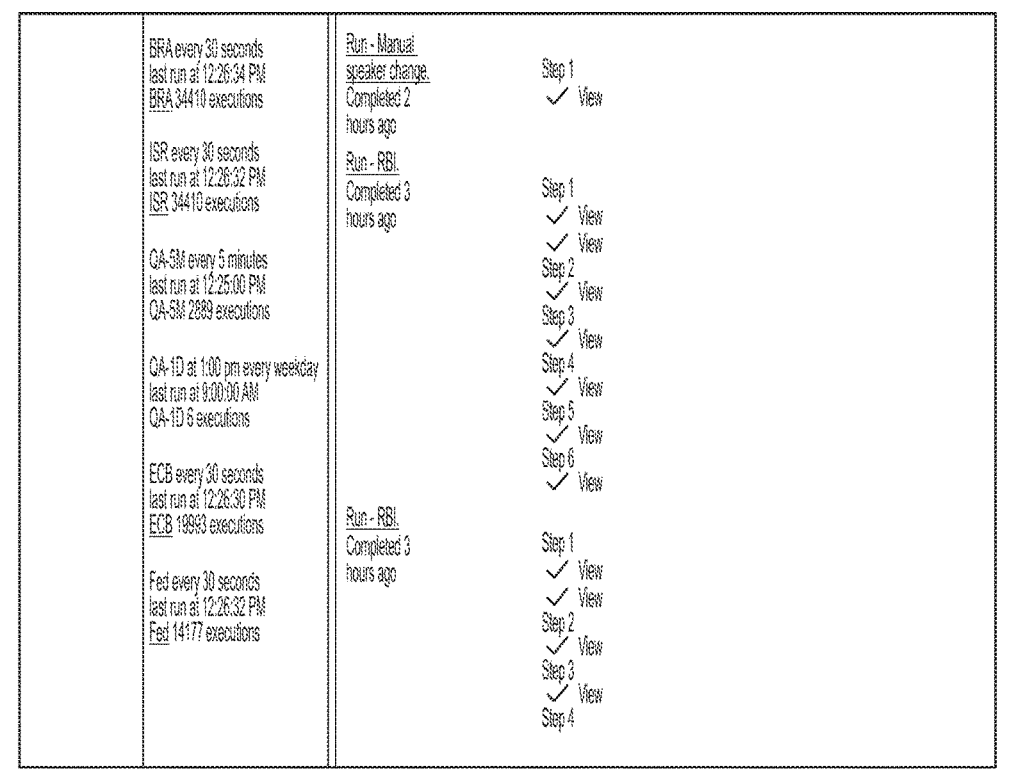

FIGS. 15A and 15B illustrate a screenshot 1500 of an application status view that shows the status associated with one or more applications and workflows according to an example embodiment. FIGS. 15A and 15B illustrate an example of scheduled applications that are scheduled to run, and a list of the last twenty runs and logs associated with each run.

Figure 16:
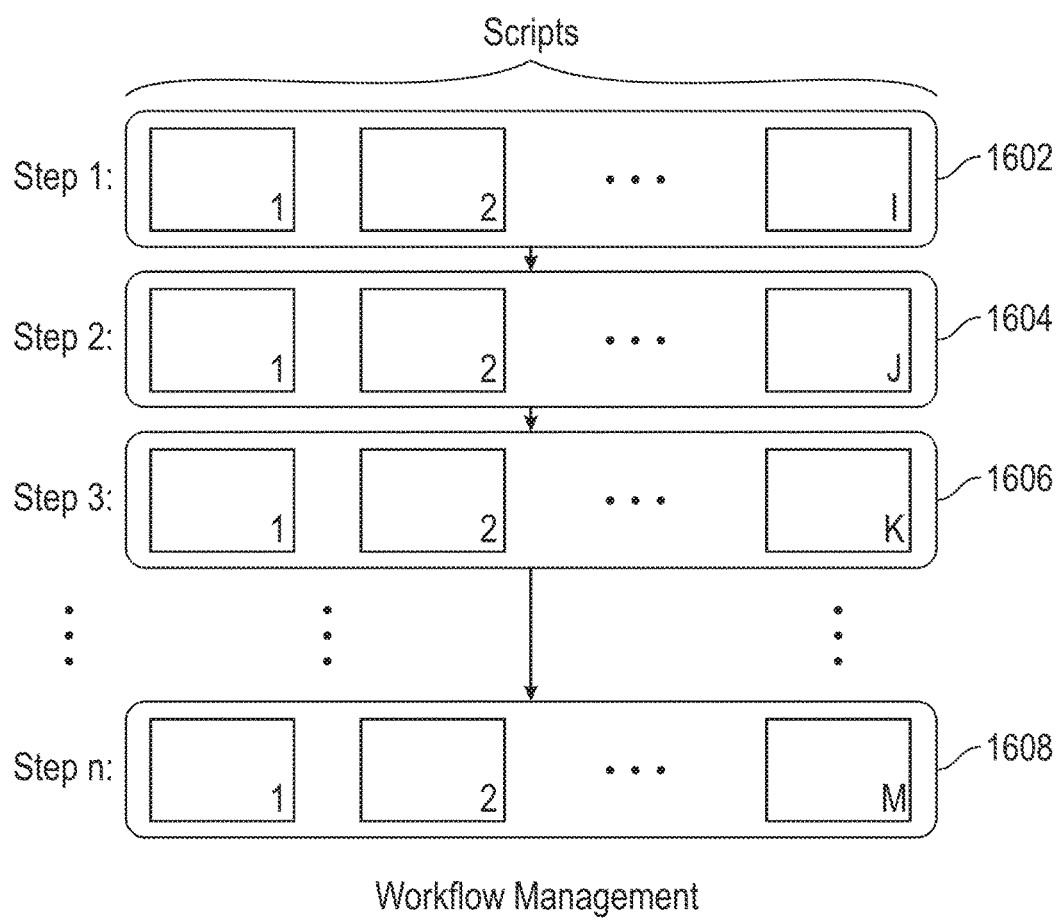
FIG. 16 illustrates a plurality of example scripts and a plurality of steps of an example application according to an example embodiment.

FIG. 16 illustrates an example of workflow construction. As shown in FIG. 16, there are a plurality of steps (Step 1 to Step N) and each step may be associated with one or more scripts. As shown, Step 1 1604 includes scripts 1 through I, Step 2 1604 includes scripts 1 through J, Step 3 1606 includes scripts 1 through K, and Step N 1608 includes scripts 1 through M.

According to another example, the system 100 may be used for RPC management. In one example, a user of a client computing device 108 may execute a saved workflow and the client computing device may transmit a request to the master server computing device 102 to schedule a workflow for execution. An immediate execution may be equivalent to scheduling an execution to run once at a next possible time. The master server computing device 102 may create a schedule item to track execution of the workflow and store the schedule item in the database 112. When the master server computing device 102 finds code to be executed, the master server computing device may cast a workflow and jobs and issue the jobs to the child server computing devices 104. The master server computing device 102 may perform casting to create a realization of an abstracted workflow, called a queue. The queue may store information associated with progress of execution of the workflow. In addition, the master server computing device 102 may create realizations of abstracted jobs in a first queue step, known as jobs. For each script in the first step, a job object may be generated. The job object may provide machine-readable instructions for the child computing device to execute the job including a language to use, a version of the language, script content, and data for macro expansion that may be associated with the job object. The job ID is also linked to the queue.

For each job generated, a message may be sent from the message broker server computing device 106 to the child server computing devices 104. The message may include a job ID. The child server computing devices 104 may consume messages from the message broker server computing device. A particular child server computing device 104 may consume the message and pull the job from the database 112 using the ID to determine if the job may be processed. At each step, the job object may receive messages to inform the master server computing device 102 regarding the status of the job. This information may be displayed by the client computing device 108. When a child server computing device 104 reports to the master server computing device 102 that a job has been completed, the master server computing device 102 may check to see if exit codes issued by the job indicate whether to move to a next job. This may be repeated until the workflow is finished.

A code example of a scheduled workflow is shown below.

```
{"_id": ObjectId("584ef5d547402258f9ed338d"),
"active": false,
"info": "Generated Mon Dec. 12 2016 14:09:09 GMT-0500 (EST)",
"name": "Run-once schedule generated from workflow 582c7fdd00b8ce840284e098.",
"every": {
"s": "*/1", "m": "*", "h": "*", "d": "*", "mo": "*", "dw": "*", "y": "*"},
"limit": NumberInt(1),
"hasLimit": true,
"count": NumberInt(1),
"userInput": {"kind": "once"},
"executions": [ISODate("2016-12-12T19:09:11.918+0000")], "workflow": {
"id": "582c7fdd00b8ce840284e098",
"info": "description of the workflow",
"name": "a workflow"},
"completed": true,
"_v": NumberInt(1),
"detected": true,
"lastExec": ISODate("2016-12-12T19:09:11.918+0000")
}
```

A code example of a queue item is shown below:

```
{
"_id": ObjectId("58d97af8220c87596d7d6814"),
"generatedSteps": {
"1": {
"exitCodes": [
NumberInt(0)
],
"timeStarted": ISODate("2017-03-27T20:50:00.564+0000"),
"jobList": {
"58d97af8220c87596d7d6819": {
"timeStarted": ISODate("2017-03-27T20:50:00.386+0000"),
"started": true,
"timeCompleted": ISODate("2017-03-27T20:50:07.180+0000"),
"complete": true
}
},
"started": true
}
},
"generatedJobs": {
"58d97af8220c87596d7d6819": {
"step": NumberInt(1)
}
},
"workflowID": ObjectId("58a3c2bb6f4Df6028ee60a3c"),
"active": true,
"info": "Generated from workflow BOJ.",
"name": "Run—BOJ.",
"app": "banks",
"started": true,
"done": true,
"status": [
{
"jobId": ObjectId("58d97af8220c87596d7d6819"),
"status": "sentToPool",
"level": "info",
"timestamp": ISODate("2017-03-27T20:50:00.294+000")
},
{
"timestamp": "2017-03-27T20:48:44.444Z",
"level": "info",
"status": "accepted",
"jobID": "58d97af8220c87596d7d6819"),
{
"timestamp": "2017-03-27T20:48:46.160Z",
"level": "info",
"status": "completed",
"jobID": "58d97af8220c87596d7d6819"
}
{
"timestamp": "2017-03-27T20:48:46.160Z",
"level": "info",
"status": "completed",
"jobID": "58d97af8220c87596d7d6819"
}
],
"exitCodes": [
{
"exitCode": NumberInt(0),
"jobId": ObjectId("58d97af8220c87596d7d6819"),
"stepNumber": NumberInt(1),
"timestamp": ISODate("2017-03-27T20:50:02.435+000")
}
],
"skeleton": [
}
"stepNumber": NumberInt(3),
"numJobs": NumberInt(1),
"scriptList": [
}
"token": "BANK_TOKEN",
"hasData": true,
"name": "extract",
"_id": ObjectId("58a399fc67e91c2241cb6315"),
"data": [
"boj"
]
}
]
},
{
"stepNumber": NumberInt(2),
"numJobs": NumberInt(1),
"scriptList": [
{
"token": "BANK_TOKEN","hasData": true,
"name": "download",
"_id": ObjectId("58a399e667e91c2241cb6314"),
```

```
"data": [
"boj"
]
}
]
},
{
"stepNumber": NumberInt(1),
"numJobs": NumberInt(1),
"scriptList": [
{
"token": "FEED_TOKEN",
"hasData": true,
"name": "rss-boj",
"_id": ObjectId("58a3c3c602d5cf23d97bd5d0"),
"data": [
"boj_1"
]
}
]
},
{
"stepNumber": NumberInt(6),
"numJobs": NumberInt(1),
"scriptList": [
{
"token": "BANK_TOKEN",
"hasData": true,
"name": "score",
"_id": ObjectId("58a39ab167e91c2241cb6317"),
"data": [
"boj"
]
}
]
},
{
"stepNumber": NumberInt(5),
"numJobs": NumberInt(1),
"scriptList": [
{"token": "BANK_TOKEN",
"hasData": true,
"name": "title_detection",
"_id": ObjectId("58a3a9ac67e91c2241cb6318"),
"data": [
"boj"
]
}
]
},
{
"stepNumber": NumberInt(4),
"numJobs": NumberInt(1),
"scriptList": [
{
"token": "BANK_TOKEN",
"hasData": true,
"name": "speaker_detection",
"_id": ObjectId("58a39a2867e91c2241cb6316"),
"data": [
"boj"
]
}
]
},
"issuedSteps": [
NumberInt(1)
],
"_v": NumberInt(2),
"numJobs": NumberInt(7),
"numSteps": NumberInt(6),
"timeStarted":    ISODate("2017-03-27T20:50:00.564+0000"),
"totalTime": NumberInt(6616),
"timeDone":    ISODate("2017-03-27T20:50:07.180+0000")
}
```

A code example for a job item is shown below:

```
{
"_id": ObjectId("58d97e5f220c87596d7d6f70"),
"data": {
"FEED_TOKEN": "isr_2"
},
"name": "rss-isr isr_2",
"scriptId": ObjectId("58a4f7b079f1742ab2f3c3e4"),
"error": false,
"warn": false,
"cancelled": false,
"complete": true,
"inProgress": false,
"status": [
{
"exitCode": null,
"message": "Machine meets job spec.",
"ETL": "blueprint",
"step": NumberInt(1),
"queueID": "58d97e5e220c87596d7d6f46",
"jobID": "58d97e5f220c87596d7d6f70",
"machineDetails": {
"props": [
0.0169677734375,
0.019287109375,
0.0213623046875
],
"load": [
0.271484375,
0.30859375,
0.341796875
],
"cpus": [
{
"times": {
"irq": NumberInt(200),
"idle": 8482698800.0,
"sys": NumberInt(175385300),
"nice": NumberInt(18500),
"user": NumberInt(306332400)
},
"speed": NumberInt(2800),
"model": "Intel® Xeon® CPU E5-2680 v2 @ 2.80 GHz"
},{
"times": {
"irq": NumberInt(0),
"idle": 8501182500.0,
"sys": NumberInt(173500400),
"nice": NumberInt(57300),
"user": NumberInt(290467600)
},
"speed": NumberInt(2800),
"model": "Intel® Xeon® CPU E5-2680 v2 @ 2.80 GHz"
}
],
```

```
"hostname": "ip-10-0-10-120"
},
"level": "info",
"status": "accepted",
"timestamp": "2017-03-27T21:03:16.991Z"
},
{
"exitCode": null,
"message": "Executing script.",
"ETL": "blueprint",
"step": NumberInt(1),
"queueID": "58d97e5e220c87596d7d6f46",
"jobID": "58d97e5f220c87596d7d6f70",
"machineDetails": {
"props": [
0.0169677734375,
0.019287109375,
0.0213623046875
],
"load": [
0.271484375,
0.30859375,
0.341796875
],
"cpus": [
...
],
"hostname": "ip-10-0-10-120"
},
"level": "info",
"status": "milestone",
"timestamp": "2017-03-27T21:03:16.991Z"),
{
"exitCode": NumberInt(-1),
"message": "Spawning child process with python.",
"ETL": "transform",
"step": NumberInt(1),
"queueID": "58d97e5e220c87596d7d6f46",
"jobID": "58d97e5f220c87596d7d6f70",
"machineDetails": {
"props": [
0.0169677734375,
0.019287109375,
0.0213623046875
],
"load": [
0.271484375,
0.30859375,
0.341796875
],
"cpus": [
...
],
"hostname": "ip-10-0-10-120"
},
"level": "info",
"status": "milestone",
"timestamp": "2017-03-27T21:03:16.991Z"
},
{
"exitCode": null,
"message": "Script execution complete. 2017-03-27T21:03:21.726Z",
"ETL": "blueprint",
"step": NumberInt(1),
"queueID": "58d97e5e220c87596d7d6f46",
"jobID": "58d97e5f220c87596d7d6f70",
"machineDetails": {
"props": [
0.015594482421875,
0.01898193359375,
0.021240234375
],
"load": [
0.24951171875,
0.3037109375,0.33984375
],
"cpus": [
...
],
"hostname": "ip-10-0-10-120"
},
"level": "info",
"status": "milestone",
"timestamp": "2017-03-27T21:03:21.726Z"
},
{
"exitCode": null,
"message": "Script returned STDERR. See job detail.",
"ETL": "blueprint",
"step": NumberInt(1),
"queueID": "58d97e5e220c87596d7d6f46",
"jobID": "58d97e5f220c87596d7d6f70",
"machineDetails": {
"props": [
0.015594482421875,
0.01898193359375,
0.021240234375
],
"load": [
0.24951171875,
0.3037109375,
0.33984375
],
"cpus": [
...
],
"hostname": "ip-10-0-10-120"
},
"level": "info",
"status": "milestone",
"timestamp": "2017-03-27T21:03:21.726Z"
},
{
"exitCode": NumberInt(0),
"message": "Job complete.",
"ETL": "blueprint",
"step": NumberInt(1),
"queueID": "58d97e5e220c87596d7d6f46","jobID": "58d97e5f220c87596d7d6f70",
"machineDetails": {
"props": [
0.015594482421875,
0.01898193359375,
0.021240234375
],
"load": [
0.24951171875,
0.3037109375,
0.33984375
],
"cpus": [
...
],
"hostname": "ip-10-0-10-120"
```

```
},
"level": "info",
"status": "completed",
"timestamp": "2017-03-27T21:03:21.726Z"
}
],
"createdOn":     ISODate("2017-03-27T21:04:31.236+
0000"),
"machineSpec": {
"language": "python",
"packages": [
]
},
"hasData": true,
"_v": NumberInt(0),
"scriptOutput": {
"stderr": [
"/usr/local/lib/python2.7/dist-packages/bs4/_init_.py:
181: UserWarning: No parser was explicitly specified, so
I'm using the best available HTML parser for this system
(\"lxml\"). This usually isn't a problem, but if you run this
code on another system, or in a different virtual environ-
ment, it may use a different parser and behave
differently.\n\nThe code that caused this warning is on line
31 of the file/tmp/0304c332-d445-498c-891
a-40a9b5712e3a. To get rid of this warning, change code
that looks like this:\n\n BeautifulSoup([your markup])\n\nto
this:\n\n BeautifulSoup([your markup], \"lxml\")\n\n
markup_type=markup_type))\n"
],
"stdout": [
" "
]
},
"exitCode": NumberInt(0)
}
```

In one example, the client computing device 108 may schedule execution of a workflow. As an example, the user may set up a schedule for execution of the workflow by submitting a request to the master server computing device 102 to schedule a workflow for execution. The master server computing device 102 may check for schedules to run, and when the master server computing device 102 finds schedules to run, the master server computing device 102 may cast the workflow associated with the schedule into a queue and jobs. Then, the master server computing device 102 may issue the jobs to child server computing devices 104 via the message broker server computing device 106. The system 100 may run schedules and may increment schedule executions.

A child server computing device 104 may send logs back to the master server computing device 102, which processes the logs. As an example, the master server computing device 102 may consume a log received from the message broker server computing device 106. The log message may include metadata specific to the execution of the job and the status of the child server computing device 104. The data associated with the log message may be used to determine server load and job complexity. In addition, the log may include a status code to indicate if the job is finished, is in progress, or has reached a milestone (e.g., is being executed by a proper compiler), has written to stdout or stdin, or if the child server computing device 104 is under too much stress. Each status code may be handled by the master server computing device 102. If the log is a status update or a milestone, the master server computing device 102 may push the log to the queue object so that users may view the status of the job. If the log is stdout or stdin, the master server computing device 102 may append output to the job object in order to make it available to users. If the log informs the master server computing device 102 that the job is complete, the master server computing device 102 may mark the job as complete and check to see if additional jobs should be issued from the workflow. If there are more jobs, the master server computing device 102 may issue the jobs. The "212" code is used to indicate to the master server computing device 102 to issue a next step of jobs asynchronously. The master server computing device 102 may issue the next step of jobs to avoid race conditions from simultaneous job completion writes. If there are no other jobs, then the master server computing device 102 may indicate that the queue is complete. If the log indicates that a child server computing device 104 has a high CPU load, then the master server computing device 102 may add an additional child server computing device 104.

Figure 17:
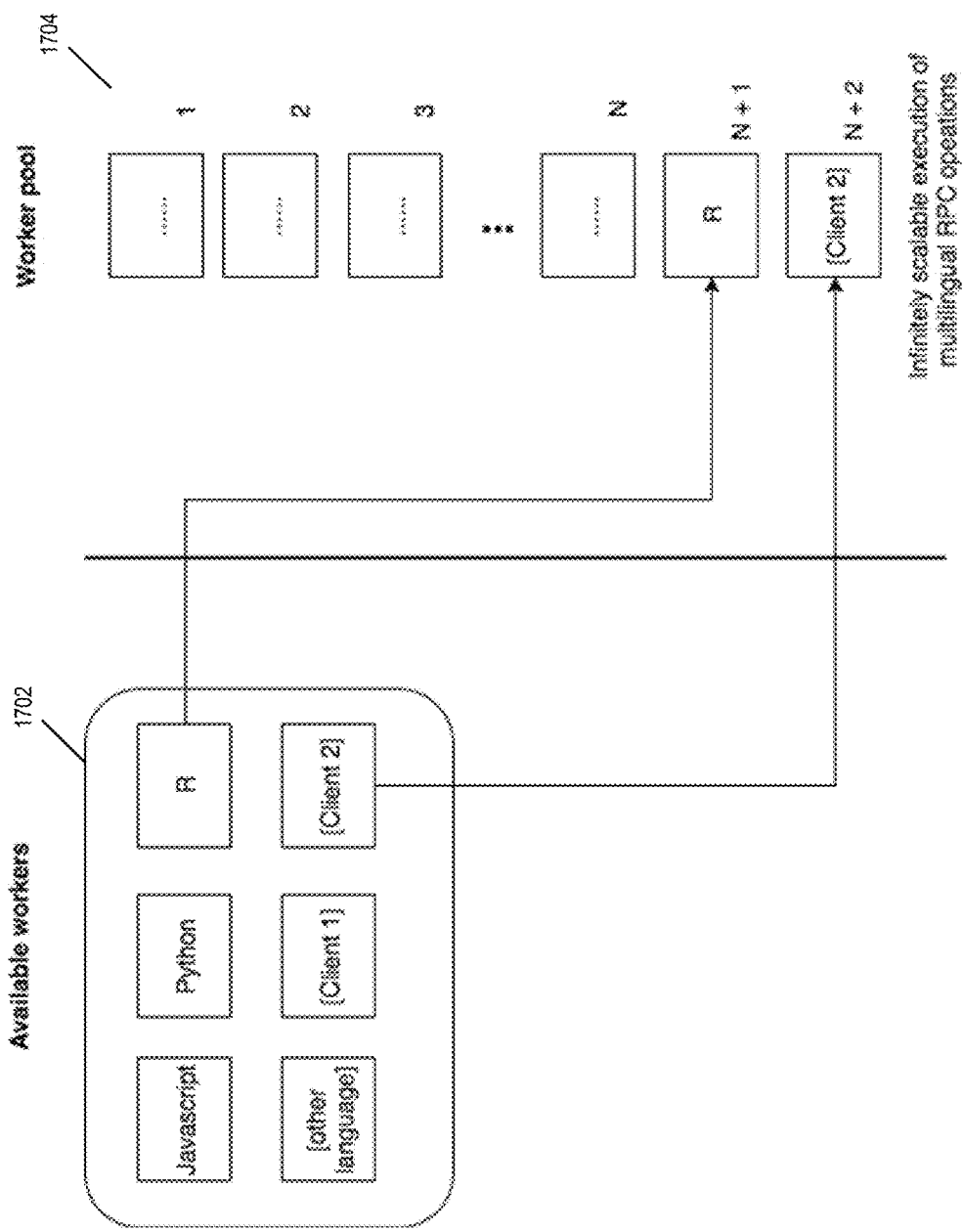
FIG. 17 illustrates a plurality of example child server computing devices according to an example embodiment.

FIG. 17 illustrates an example of available child server computing devices 104 associated with a pool of available workers 1704 according to an example embodiment.

Figure 18:
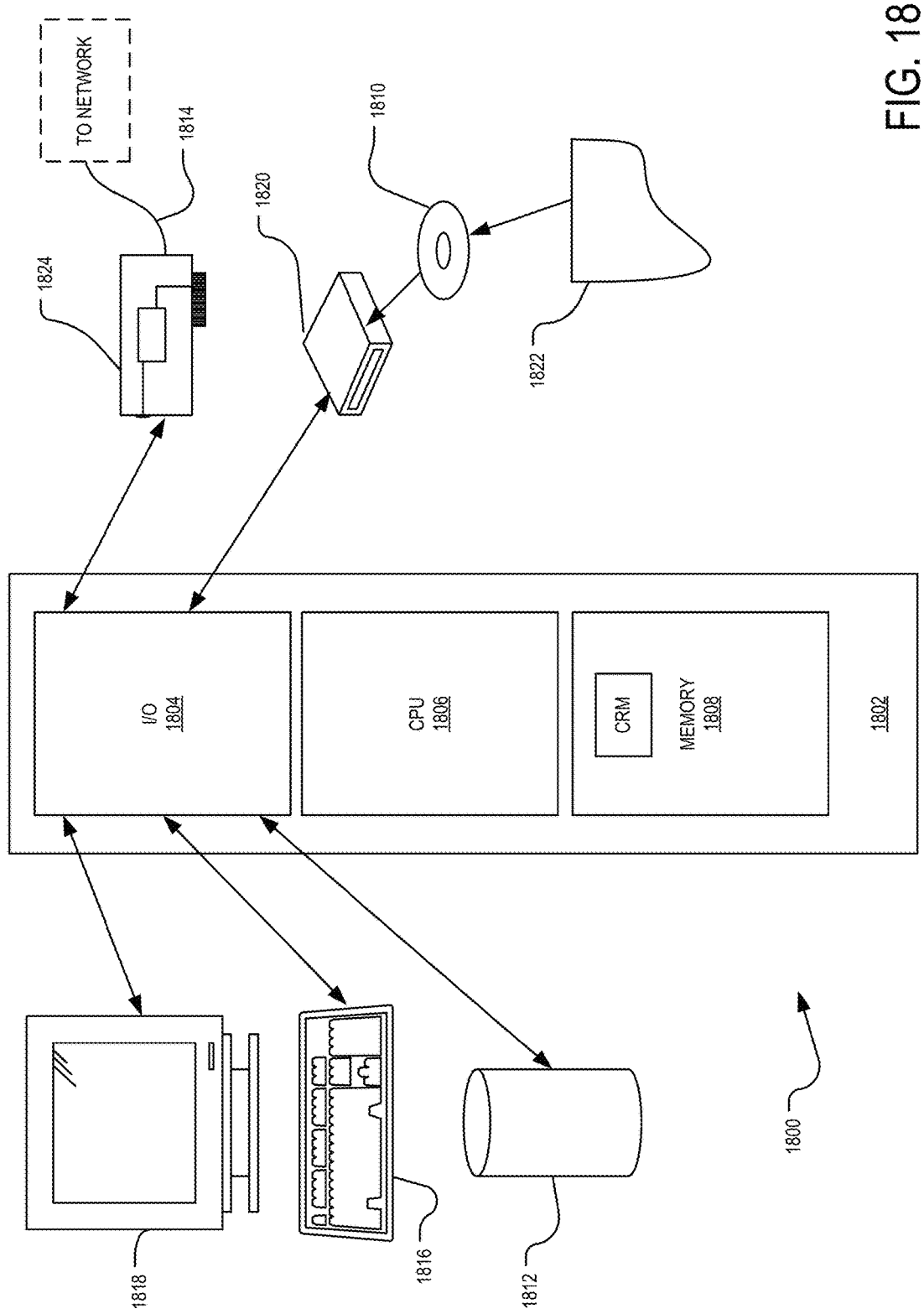
FIG. 18 illustrates a block diagram of a computing device according to an example embodiment.

FIG. 18 illustrates an example computing system 1800 that may implement various systems, such as the master server computing device 102, the child server computing device 104, the message broker server computing device 106, and the client computing device 108, and the methods discussed herein, such as process 300. A general purpose computer system 1800 is capable of executing a computer program product to execute a computer process. Data and program files may be input to the computer system 1800, which reads the files and executes the programs therein such as the browser 136 and the master application 138. Some of the elements of a general purpose computer system 1800 are shown in FIG. 18 wherein a processor 1802 is shown having an input/output (I/O) section 1804, a central processing unit (CPU) 1806, and a memory section 1808. There may be one or more processors 1802, such that the processor 1802 of the computer system 1800 comprises a single central-processing unit 1806, or a plurality of processing units, commonly referred to as a parallel processing environment. The computer system 1800 may be a conventional computer, a server, a distributed computer, or any other type of computer, such as one or more external computers made available via a cloud computing architecture. The presently described technology is optionally implemented in software devices loaded in memory 1808, stored on a configured DVD/CD-ROM 1810 or storage unit 1812, and/or communicated via a wired or wireless network link 1814, thereby transforming the computer system 1800 in FIG. 18 to a special purpose machine for implementing the described operations.

The memory section 1808 may be volatile media, non-volatile media, removable media, non-removable media, and/or other media or mediums that can be accessed by a general purpose or special purpose computing device. For example, the memory section 1808 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 1804 is connected to one or more user-interface devices (e.g., a keyboard 1816 and a display unit 1818), a disc storage unit 1812, and a disc drive unit 1820. Generally, the disc drive unit 1820 is a DVD/CD-ROM drive unit capable of reading the DVD/CD-ROM medium 1810, which typically contains programs and data 1822. Computer program products containing mechanisms to effectuate the systems and methods in accordance with the presently described technology may reside in the memory section 1804, on a disc storage unit 1812, on the DVD/CD-ROM medium 1810 of the computer system 1800, or on external storage devices made available via a cloud computing architecture with such computer program products, including one or more database management products, web server products, application server products, and/or other additional software components. Alternatively, a disc drive unit 1820 may be replaced or supplemented by a tape drive unit, or other storage medium drive unit. The network adapter 1824 is capable of connecting the computer system 1800 to a network via the network link 1814, through which the computer system can receive instructions and data. Examples of such systems include personal computers, Intel or PowerPC-based computing systems, AMD-based computing systems, ARM-based computing systems, and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 1800 is connected (by wired connection and/or wirelessly) to a local network through the network interface or adapter 1824, which is one type of communications device. When used in a WAN-networking environment, the computer system 1800 typically includes a modem, a network adapter, or any other type of communications device for establishing communications over the wide area network. In a networked environment, program modules depicted relative to the computer system 1800 or portions thereof, may be stored in a remote memory storage device. It is appreciated that the network connections shown are examples of communications devices for and other means of establishing a communications link between the computers may be used.

In an example implementation, source code executed by the master server computing device 102, the child server computing device computer 104, the message broker computing device 106, or the client computing device 108, a plurality of internal and external databases, source databases, and/or cached data on servers are stored in the database 112, memory 116 of the master server computing device 102, memory 122 of the child server computing device 104, memory 126 of the message broker server computing device 106, memory 130 of the client computing device 108, or other storage systems, such as the disk storage unit 1812 or the DVD/CD-ROM medium 1810, and/or other external storage devices made available and accessible via a network architecture. The source code executed by the master server computing device 102, the child server computing device 104, the message broker server computing device 106, and the client computing device 108 may be embodied by instructions stored on such storage systems and executed by the processor 1802.

Some or all of the operations described herein may be performed by the processor 1802, which is hardware. Further, local computing systems, remote data sources and/or services, and other associated logic represent firmware, hardware, and/or software configured to control operations of the generative programming system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 1802 and a user may interact with a Graphical User Interface (GUI) using one or more user-interface devices (e.g., the keyboard 1816, the display unit 1818, and the user devices 1804) with some of the data in use directly coming from online sources and data stores. The system set forth in FIG. 18 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A system comprising:
a memory; and
at least one processor to:
transmit a request for an integrated development environment (IDE) user interface for creating an application to a server computing device;
receive and display the IDE user interface on a display, the IDE user interface comprising an application creation section that displays a user interface for creating an application, a code section that receives and displays text associated with a script, a script section that displays at least one user interface element including a list of at least one pre-written scripts, and a workflow section that displays at least one ordered step of the application and at least one script associated with each step of the application;
receive application information entered into the user interface from a user and transmit the application information to the server computing device to be stored in a database, the application information comprising a name of the application;
add at least one script to the application, the at least one script one of manually entered into the code section by the user and selected from the script section displaying the list of at least one pre-written scripts;
transmit the at least one script with the application information to the server computing device to be stored in the database;
receive at least one workflow of the at least one ordered step of the application entered into the workflow section from the user, each step comprising at least one associated script;
generate machine-readable and executable code for the application based on the at least one workflow when the user selects an execution user interface element; and
schedule execution of the machine-readable and executable code based on input provided by the user.

2. The system of claim 1, the at least one processor further to receive a selection by the user of a script from the list of at least one pre-written scripts, the script performing a particular function, and to receive a drop of the script into a particular step in the workflow of the application.

3. The system of claim 1, the at least one processor further to receive a selection by the user of a first script written in a first programming language that performs a first function and to receive a selection by the user of a second script written in a second programming language that is different from the first programming language.

4. The system of claim 1, the at least one processor further to receive a selection by the user of a first script that performs a first function and to receive a selection by the user of a second script that performs a second function, and to receive a drop of the first script and the second script into a step in the workflow of the application to execute both the first script and the second script in parallel.

5. The system of claim 1, the at least one processor further to transmit a request to modify at least one script of the application to the server computing device, receive the IDE user interface from the server computing device, receive an update to the at least one script entered into the user interface from the user, re-generate machine-readable and executable code for the application based on a selection of the execution user interface element, and re-schedule execution of the machine-readable and executable code based on input provided by the user.

6. The system of claim 1, the at least one processor further to transmit a request to modify the at least one workflow to the server computing device, receive the IDE user interface from the server computing device, receive an update to the at least one workflow entered into the user interface by the user, re-generate machine-readable and executable code for the application based on a selection of the execution user interface element, and re-schedule execution of the machine-readable and executable code based on input provided by the user.

7. The system of claim 1, the at least one processor further to display status information associated with the application including a particular interval of time when the application is scheduled to execute.

8. A method comprising:
transmitting, by at least one processor, a request for an integrated development environment (IDE) user interface for creating an application to a server computing device;
receiving and displaying, by the at least one processor, the IDE user interface on a display, the IDE user interface comprising an application creation section that displays a user interface for creating an application, a code section that receives and displays text associated with a script, a script section that displays at least one user interface element including a list of at least one pre-written scripts, and a workflow section that displays at least one ordered step of the application and at least one script associated with each step of the application;
receiving, by the at least one processor, application information entered into the user interface from a user and transmitting the application information to the server computing device to be stored in a database, the application information comprising a name of the application;
adding, by the at least one processor, at least one script to the application, the at least one script one of manually entered into the code section by the user and selected from the script section displaying the list of at least one pre-written scripts;
transmitting, by the at least one processor, the at least one script with the application information to the server computing device to be stored in the database;
receiving, by the at least one processor, at least one workflow of the at least one ordered step of the application entered into the workflow section from the user, each step comprising at least one associated script;
generating, by the at least one processor, machine-readable and executable code for the application based on the at least one workflow when the user selects an execution user interface element; and
scheduling, by the at least one processor, execution of the machine-readable and executable code based on input provided by the user.

9. The method of claim 8, further comprising receiving a selection by the user of a script from the list of at least one pre-written scripts, the script performing a particular function, and receiving a drop of the script into a particular step in the workflow of the application.

10. The method of claim 8, further comprising receiving a selection by the user of a first script written in a first programming language that performs a first function and receiving a selection by the user of a second script written in a second programming language that is different from the first programming language.

11. The method of claim 8, further comprising receiving a selection by the user of a first script that performs a first function and receiving a selection by the user of a second script that performs a second function, and receiving a drop of the first script and the second script into a step in the workflow of the application to execute both the first script and the second script in parallel.

12. The method of claim 8, further comprising transmitting a request to modify at least one script of the application to the server computing device, receiving the IDE user interface from the server computing device, receiving an update to the at least one script entered into the user interface from the user, re-generating machine-readable and executable code for the application based on a selection of the execution user interface element, and re-scheduling execution of the machine-readable and executable code based on input provided by the user.

13. The method of claim 8, further comprising transmitting a request to modify the at least one workflow to the server computing device, receiving the IDE user interface from the server computing device, receiving an update to the at least one workflow entered into the user interface by the user, re-generating machine-readable and executable code for the application based on a selection of the execution user interface element, and re-scheduling execution of the machine-readable and executable code based on input provided by the user.

14. The method of claim 8, further comprising displaying status information associated with the application including a particular interval of time when the application is scheduled to execute.

15. A non-transitory computer-readable storage medium, having instructions stored thereon that, when executed by a computing device cause the computing device to perform operations, the operations comprising:
   transmitting a request for an integrated development environment (IDE) user interface for creating an application to a server computing device;
   receiving and displaying the IDE user interface on a display, the IDE user interface comprising an application creation section that displays a user interface for creating an application, a code section that receives and displays text associated with a script, a script section that displays at least one user interface element including a list of at least one pre-written scripts, and a workflow section that displays at least one ordered step of the application and at least one script associated with each step of the application;
   receiving application information entered into the user interface from a user and transmitting the application information to the server computing device to be stored in a database, the application information comprising a name of the application;
   adding at least one script to the application, the at least one script one of manually entered into the code section by the user and selected from the script section displaying the list of at least one pre-written scripts;
   transmitting the at least one script with the application information to the server computing device to be stored in the database;
   receiving at least one workflow of the at least one ordered step of the application entered into the workflow section from the user, each step comprising at least one associated script;
   generating machine-readable and executable code for the application based on the at least one workflow when the user selects an execution user interface element; and
   scheduling execution of the machine-readable and executable code based on input provided by the user.

16. The non-transitory computer-readable medium of claim 15, the operations further comprising receiving a selection by the user of a script from the list of at least one pre-written scripts, the script performing a particular function, and receiving a drop of the script into a particular step in the workflow of the application.

17. The non-transitory computer-readable medium of claim 15, the operations further comprising receiving a selection by the user of a first script written in a first programming language that performs a first function and receiving a selection by the user of a second script written in a second programming language that is different from the first programming language.

18. The non-transitory computer-readable medium of claim 15, the operations further comprising receiving a selection by the user of a first script that performs a first function and receiving a selection by the user of a second script that performs a second function, and receiving a drop of the first script and the second script into a step in the workflow of the application to execute both the first script and the second script in parallel.

19. The non-transitory computer-readable medium of claim 15, the operations further comprising transmitting a request to modify at least one script of the application to the server computing device, receiving the IDE user interface from the server computing device, receiving an update to the at least one script entered into the user interface from the user, re-generating machine-readable and executable code for the application based on a selection of the execution user interface element, and re-scheduling execution of the machine-readable and executable code based on input provided by the user.

20. The non-transitory computer-readable medium of claim 15, the operations further comprising transmitting a request to modify the at least one workflow to the server computing device, receiving the IDE user interface from the server computing device, receiving an update to the at least one workflow entered into the user interface by the user, re-generating machine-readable and executable code for the application based on a selection of the execution user interface element, and re-scheduling execution of the machine-readable and executable code based on input provided by the user.

* * * * *